United States Patent
Kim et al.

(10) Patent No.: US 10,349,445 B2
(45) Date of Patent: Jul. 9, 2019

(54) METHOD FOR TRANSMITTING OR RECEIVING FRAME IN WIRELESS LAN SYSTEM AND APPARATUS THEREFOR

(71) Applicant: LG ELECTRONICS INC., Seoul (KR)

(72) Inventors: Jeongki Kim, Seoul (KR); Kiseon Ryu, Seoul (KR); Jinsoo Choi, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/567,489

(22) PCT Filed: May 16, 2016

(86) PCT No.: PCT/KR2016/005169
§ 371 (c)(1),
(2) Date: Oct. 18, 2017

(87) PCT Pub. No.: WO2016/182412
PCT Pub. Date: Nov. 17, 2016

(65) Prior Publication Data
US 2018/0098352 A1    Apr. 5, 2018

Related U.S. Application Data

(60) Provisional application No. 62/161,275, filed on May 14, 2015, provisional application No. 62/276,242, filed on Jan. 8, 2016.

(51) Int. Cl.
*H04W 4/00* (2018.01)
*H04W 74/04* (2009.01)
(Continued)

(52) U.S. Cl.
CPC ............... *H04W 74/04* (2013.01); *H04L 1/00* (2013.01); *H04W 12/06* (2013.01); *H04W 74/08* (2013.01); *H04W 84/12* (2013.01)

(58) Field of Classification Search
CPC ............ H04B 7/00; H04L 1/00; H04W 12/06; H04W 74/04; H04W 74/08; H04W 84/12
See application file for complete search history.

(56) References Cited

U.S. PATENT DOCUMENTS

| | | | |
|---|---|---|---|
| 2009/0059834 A1 | 3/2009 | Qian | |
| 2011/0194644 A1* | 8/2011 | Liu | H04L 5/0023 375/295 |
| 2017/0289987 A1* | 10/2017 | Seok | H04W 74/00 |

FOREIGN PATENT DOCUMENTS

| JP | 2006-287933 A | 10/2006 |
|---|---|---|
| KR | 10-2012-0135247 A | 12/2012 |

(Continued)

*Primary Examiner* — Minh Trang T Nguyen
(74) *Attorney, Agent, or Firm* — Birch, Stewart, Kolasch & Birch, LLP

(57) ABSTRACT

According to an embodiment of the present invention, a method for managing a network allocation vector (NAV) by a station (STA) in a wireless LAN system supporting a high efficiency physical layer protocol data unit (HE PPDU) comprises the steps of: receiving a frame including an HE-SIG A field and an MAC header; and updating an NAV on the basis of a transmission opportunity duration (TXOP) field included in the HE-SIG A field, wherein, in the step of updating the NAV, the STA may set, for the NAV of the STA, a TXOP duration value indicated by the TXOP duration field when the TXOP duration value indicated by the TXOP duration field is larger than a current NAV value configured by the STA, and the STA may reset the NAV of the STA without comparison with the current NAV value when the TXOP duration field indicates a predetermined value.

13 Claims, 24 Drawing Sheets

(51) Int. Cl.
*H04L 1/00* (2006.01)
*H04W 84/12* (2009.01)
*H04W 12/06* (2009.01)
*H04W 74/08* (2009.01)

(56) References Cited

FOREIGN PATENT DOCUMENTS

KR  10-2013-0007493 A    1/2013
WO  WO 2013/147567 A1   10/2013

\* cited by examiner

METHOD FOR TRANSMITTING OR RECEIVING FRAME IN WIRELESS LAN SYSTEM AND APPARATUS THEREFOR

CROSS REFERENCE TO RELATED APPLICATIONS

This application is the National Phase of PCT International Application No. PCT/KR2016/005169, filed on May 16, 2016, which claims priority under 35 U.S.C. 119(e) to U.S. Provisional Application Nos. 62/161,275, filed on May 14, 2015 and 62/276,242, filed on Jan. 8, 2016, all of which are hereby expressly incorporated by reference into the present application.

TECHNICAL FIELD

The present invention relates to a method of transmitting or receiving frames in a wireless LAN system and, more particularly, to a method of transmitting and receiving frames for management of a transmission opportunity (TXOP) or network allocation vector (NAV) and an apparatus therefor.

BACKGROUND ART

Standards for Wireless Local Area Network (WLAN) technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WEAN standards have evolved into IEEE 802.11ac that uses a bandwidth of up to 160 MHz and supports a transmission rate of up to 1 Gbits/s for 8 spatial streams and IEEE 802.11ax standards are under discussion.

DETAILED DESCRIPTION OF THE INVENTION

Technical Problems

It is a technical object of the present invention to provide a method of efficiently managing, by a third party STA that has received a frame, an NAV and solving, by a TXOP holder/response STA, a problem caused by inequality between a TXOP duration value and a MAC duration value in a wireless LAN system supporting an HE PPDU.

The present invention is not limited to what has been described hereinabove and other technical objects may be derived from embodiments of the present invention.

Technical Solutions

According to an aspect of the present invention, provided herein is a method of managing, by a station (STA), a Network Allocation Vector (NAV) in a wireless Local Area Network (LAN) system supporting a High-Efficiency Physical Layer Protocol Data Unit (HE PPDU), including receiving a frame including a High-Efficiency Signal A (HE-SIG A) field and a Media Access Control (MAC) header; and updating the NAV based on a transmission opportunity (TXOP) duration field included in the HE-SIG A field, wherein the updating the NAV includes setting the NAV of the STA to a TXOP duration value indicated by the TXOP duration field when the TXOP duration value indicated by the TXOP duration field is larger than a current NAV value set in the STA and resetting the NAV of the STA without comparison with the current NAV value when the TXOP duration field indicates a predetermined value.

According to another aspect of the present invention, provided herein is a station (STA) for managing a Network Allocation Vector (NAV) in a wireless Local Area Network (LAN) system supporting a High-Efficiency Physical Layer Protocol Data Unit (HE PPDU), including a receiver configured to receive a frame including a High-Efficiency Signal A (HE-SIG A) field and a Media Access Control (MAC) header; and a processor configured to update the NAV based on a Transmission Opportunity (TXOP) duration field included in the HE-SIG A field, wherein, in updating the NAV, the processor sets the NAV of the STA to a TXOP duration value indicated by the TXOP duration field when the TXOP duration value indicated by the TXOP duration field is larger than a current NAV value set in the STA and resets the NAV of the STA without comparison with the current NAV value when the TXOP duration field indicates a predetermined value.

The predetermined value may indicate that the length of a corresponding TXOP duration is "0".

If the TXOP duration field indicates the predetermined value, the STA may reset the NAV of the STA under the assumption that the received frame is a last frame transmitted in a corresponding TXOP duration.

The predetermined value may correspond to a TXOP termination indicator.

The TXOP duration value indicated by the TXOP duration field of the HE-SIG A field may be set to be equal to or larger than a MAC duration value indicated by the MAC header.

The predetermined value may be used to eliminate a redundant TXOP duration caused by a difference between the TXOP duration value indicated by the TXOP duration field and the MAC duration value indicated by the MAC header.

The STA may update the NAV through the TXOP duration value when the MAC header cannot be decoded.

A granularity of a time unit of the TXOP duration value may be set to be greater than a granularity of a time unit of the MAC duration value.

The NAV of the STA may be used to set a time during which channel access of the STA is limited in order to protect of a TXOP of another STA designated by the frame as a sender or a recipient.

According to still another aspect of the present invention, provided herein a method of transmitting, by a station (STA), a frame in a wireless Local Area Network (LAN) system supporting a High-Efficiency Physical Layer Protocol Data Unit (HE PPDU), including setting a Transmission Opportunity (TXOP) duration field included in a High-Efficiency Signal A (HE-SIG A) field; and transmitting a frame including the HE-SIG A field, wherein the setting the TXOP duration field includes setting a TXOP duration value corresponding to the length of a TXOP duration in the TXOP duration field when the frame is not a last frame transmitted in the TXOP duration and setting a predetermined value corresponding to a TXOP termination indicator in the TXOP duration field when the frame is the last frame transmitted in the TXOP duration.

The predetermined value may indicate that the length of the TXOP duration is "0".

The TXOP duration value set in the TXOP duration field of the HE-SIG A field may be set to be equal to or larger than a Media Access Control (MAC) duration value indicated by a MAC header.

The predetermined value may be used to eliminate a redundant TXOP duration caused by a difference between the TXOP duration value set in the TXOP duration field and the MAC duration value set in the MAC header.

The setting the TXOP duration field may include determining the TXOP duration value to be set in the TXOP duration field of the HE-SIG A field, based on the MAC duration value set in the MAC header, and a granularity of a time unit of the TXOP duration value may be set to be greater than a granularity of a time unit of the MAC duration value.

Advantageous Effects

According to an embodiment of the present invention, since a redundant TXOP duration which is present in an NAV is truncated based on a TXOP duration field included in an HE-SIG A field, an over-protection problem of a TXOP caused by inequality between a TXOP duration indicated by the HE-SIG A field and a MAC duration value indicated by a MAC header can be solved and third party STAs that do not decode the MAC header can efficiently manage the NAV.

Technical effects that are not described above may be derived from embodiments of the present invention.

MODE FOR INVENTION

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention.

As described before, the following description is given of a method and apparatus for increasing a spatial reuse rate in a Wireless Local Area Network (WLAN) system. To do so, a WLAN system to which the present invention is applied will first be described in detail.

Figure 1:
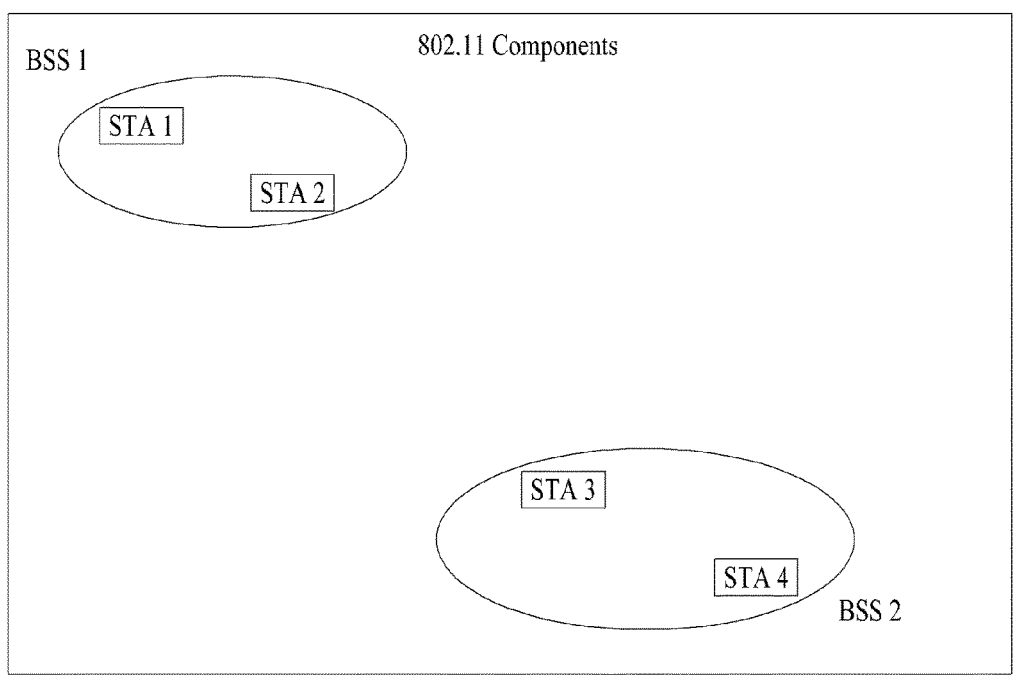
FIG. 1 illustrates an example of a configuration of a wireless LAN system.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Media Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
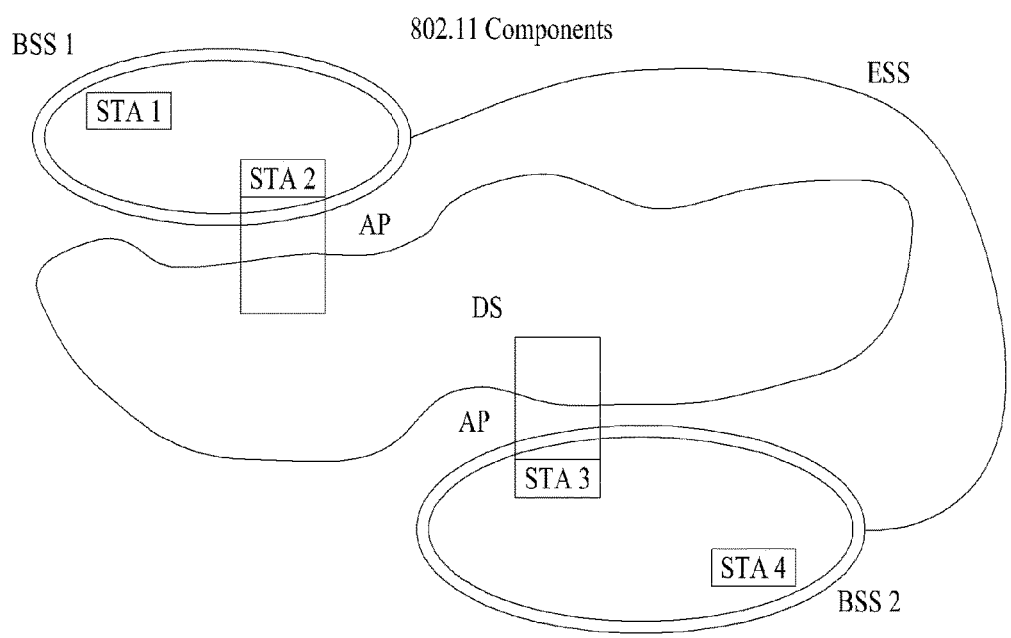
FIG. 2 illustrates another example of a configuration of a wireless LAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Layer Architecture

An operation of an STA in a WLAN system may be described from the perspective of a layer architecture. A processor may implement the layer architecture in terms of device configuration. The STA may have a plurality of layers. For example, the 802.11 standards mainly deal with a MAC sublayer and a PHY layer on a Data Link Layer (DLL). The PHY layer may include a Physical Layer Convergence Protocol (PLCP) entity, a Physical Medium Dependent (PMD) entity, and the like. Each of the MAC sublayer and the PHY layer conceptually includes management entities called MAC sublayer Management Entity (MLME) and Physical Layer Management Entity (PLME). These entities provide layer management service interfaces through which a layer management function is executed.

To provide a correct MAC operation, a Station Management Entity (SME) resides in each STA. The SME is a layer independent entity which may be perceived as being present in a separate management plane or as being off to the side. While specific functions of the SME are not described in detail herein, the SME may be responsible for collecting layer-dependent states from various Layer Management Entities (LMEs) and setting layer-specific parameters to similar values. The SME may execute these functions and implement a standard management protocol on behalf of general system management entities.

The above-described entities interact with one another in various manners. For example, the entities may interact with one another by exchanging GET/SET primitives between them. A primitive refers to a set of elements or parameters related to a specific purpose. An XX-GET.request primitive is used to request a predetermined MIB attribute value (management information-based attribute information). An XX-GET.confirm primitive is used to return an appropriate MIB attribute information value when the Status field indicates "Success" and to return an error indication in the Status field when the Status field does not indicate "Success". An XX-SET.request primitive is used to request setting of an indicated MIB attribute to a predetermined value. When the MIB attribute indicates a specific operation, the MIB attribute requests the specific operation to be performed. An XX-SET.confirm primitive is used to confirm that the indicated MIB attribute has been set to a requested value when the Status field indicates "Success" and to return an error condition in the Status field when the Status field does not indicate "Success". When the MIB attribute indicates a specific operation, it confirms that the operation has been performed.

Also, the MLME and the SME may exchange various MLME_GET/SET primitives through an MLME Service Access Point (MLME_SAP). In addition, various PLME_GET/SET primitives may be exchanged between the PLME and the SME through a PLME_SAP, and exchanged between the MLME and the PLME through an MLME-PLME_SAP.

Link Setup Process

Figure 3:
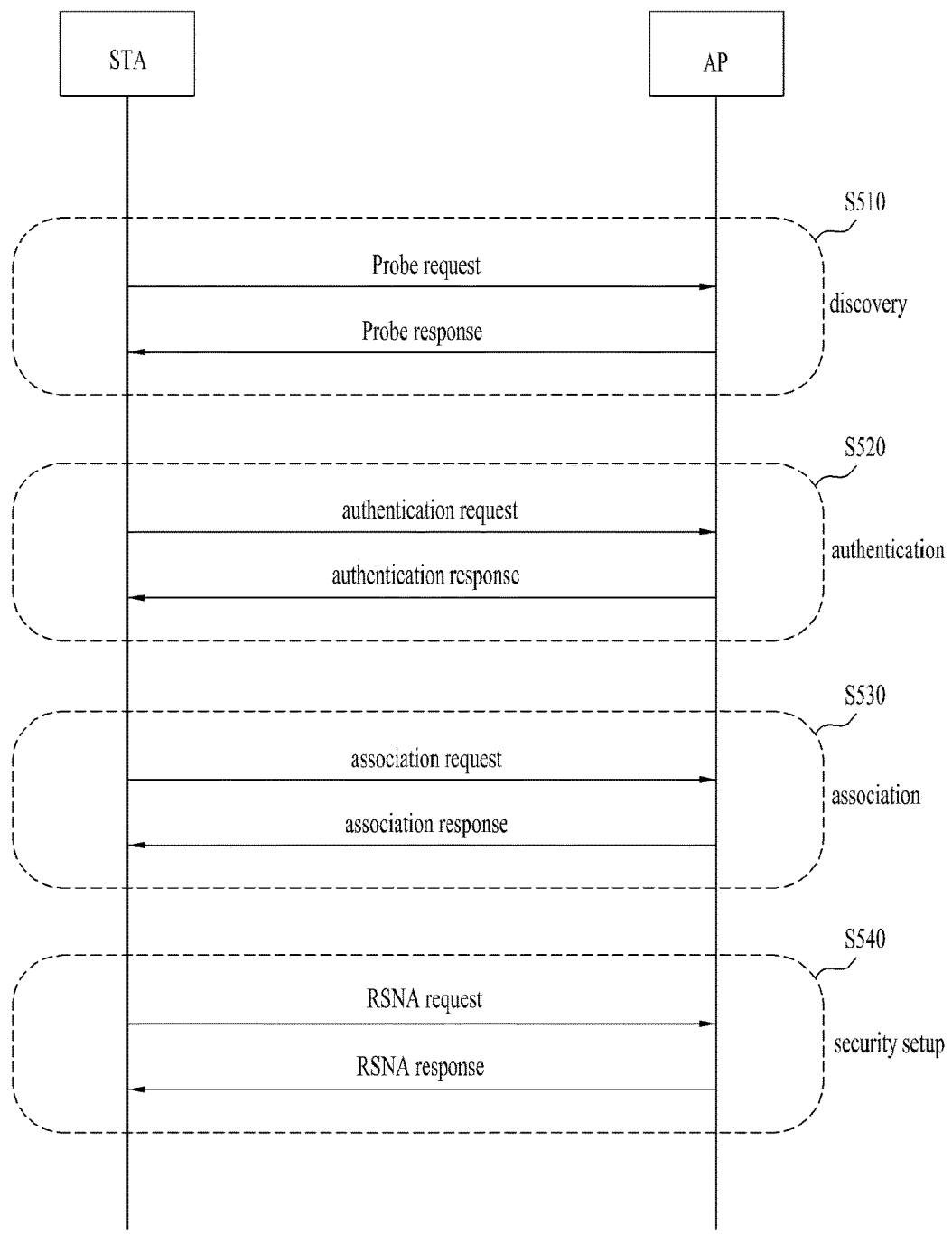
FIG. 3 illustrates a general link setup procedure.

FIG. 3 is a flowchart explaining a general link setup process according to an exemplary embodiment of the present invention.

In order to allow an STA to establish link setup on the network as well as to transmit/receive data over the network, the STA must perform such link setup through processes of network discovery, authentication, and association, and must establish association and perform security authentication. The link setup process may also be referred to as a session initiation process or a session setup process. In addition, an association step is a generic term for discovery, authentication, association, and security setup steps of the link setup process.

Link setup process is described referring to FIG. 3.

In step S510, STA may perform the network discovery action. The network discovery action may include the STA scanning action. That is, STA must search for an available network so as to access the network. The STA must identify a compatible network before participating in a wireless network. Here, the process for identifying the network contained in a specific region is referred to as a scanning process.

The scanning scheme is classified into active scanning and passive scanning.

FIG. 3 is a flowchart illustrating a network discovery action including an active scanning process. In the case of the active scanning, an STA configured to perform scanning transmits a probe request frame and waits for a response to the probe request frame, such that the STA can move between channels and at the same time can determine which Access Point (AP) is present in a peripheral region. A responder transmits a probe response frame, acting as a response to the probe request frame, to the STA having transmitted the probe request frame. In this case, the responder may be an STA that has finally transmitted a beacon frame in a BSS of the scanned channel. In BSS, since the AP transmits the beacon frame, the AP operates as a responder. In IBSS, since STAs of the IBSS sequentially transmit the beacon frame, the responder is not constant. For example, the STA, that has transmitted the probe request frame at Channel #1 and has received the probe response frame at Channel #1, stores BSS-associated information contained in the received probe response frame, and moves to the next channel (for example, Channel #2), such that the STA may perform scanning using the same method (i.e., probe request/response transmission/reception at Channel #2).

Although not shown in FIG. 3, the scanning action may also be carried out using passive scanning. AN STA configured to perform scanning in the passive scanning mode waits for a beacon frame while simultaneously moving from one channel to another channel. The beacon frame is one of management frames in IEEE 802.11, indicates the presence of a wireless network, enables the STA performing scanning to search for the wireless network, and is periodically transmitted in a manner that the STA can participate in the wireless network. In BSS, the AP is configured to periodically transmit the beacon frame. In IBSS, STAs of the IBSS are configured to sequentially transmit the beacon frame. If each STA for scanning receives the beacon frame, the STA stores BSS information contained in the beacon frame, and moves to another channel and records beacon frame information at each channel. The STA having received the beacon frame stores BSS-associated information contained in the received beacon frame, moves to the next channel, and thus performs scanning using the same method.

In comparison between the active scanning and the passive scanning, the active scanning is more advantageous than the passive scanning in terms of delay and power consumption.

After the STA discovers the network, the STA may perform the authentication process in step S520. The authentication process may be referred to as a first authentication process in such a manner that the authentication process can be clearly distinguished from the security setup process of step S540.

The authentication process may include transmitting an authentication request frame to an AP by the STA, and transmitting an authentication response frame to the STA by the AP in response to the authentication request frame. The authentication frame used for authentication request/response may correspond to a management frame.

The authentication frame may include an authentication algorithm number, an authentication transaction sequence number, a state code, a challenge text, a Robust Security Network (RSN), a Finite Cyclic Group (FCG), etc. The above-mentioned information contained in the authentication frame may correspond to some parts of information capable of being contained in the authentication request/response frame, may be replaced with other information, or may include additional information.

The STA may transmit the authentication request frame to the AP. The AP may decide whether to authenticate the corresponding STA on the basis of information contained in the received authentication request frame. The AP may provide the authentication result to the STA through the authentication response frame.

After the STA has been successfully authenticated, the association process may be carried out in step S530. The association process may involve transmitting an association request frame to the AP by the STA, and transmitting an association response frame to the STA by the AP in response to the association request frame.

For example, the association request frame may include information associated with various capabilities, a beacon listen interval, a Service Set Identifier (SSID), supported rates, supported channels, RSN, mobility domain, supported operating classes, a TIM (Traffic Indication Map) broadcast request, interworking service capability, etc.

For example, the association response frame may include information associated with various capabilities, a state code, an Association ID (AID), supported rates, an Enhanced Distributed Channel Access (EDCA) parameter set, a Received Channel Power Indicator (RCPI), a Received Signal to Noise Indicator (RSNI), mobility domain, a timeout interval (association comeback time), an overlapping BSS scan parameter, a TIM broadcast response, a Quality of Service (QoS) map, etc.

The above-mentioned information may correspond to some parts of information capable of being contained in the association request/response frame, may be replaced with other information, or may include additional information.

After the STA has been successfully associated with the network, a security setup process may be carried out in step S540. The security setup process of Step S540 may be referred to as an authentication process based on Robust Security Network Association (RSNA) request/response. The authentication process of step S520 may be referred to as a first authentication process, and the security setup process of Step S540 may also be simply referred to as an authentication process.

For example, the security setup process of Step S540 may include a private key setup process through 4-way handshaking based on an Extensible Authentication Protocol over LAN (EAPOL) frame. In addition, the security setup process may also be carried out according to other security schemes not defined in IEEE 802.11 standards.

Medium Access Mechanism

In the IEEE 802.11—based WLAN system, a basic access mechanism of Medium Access Control (MAC) is a Carrier Sense Multiple Access with Collision Avoidance (CSMA/CA) mechanism. The CSMA/CA mechanism is referred to as a Distributed Coordination Function (DCF) of IEEE 802.11 MAC, and basically includes a "Listen Before Talk" access mechanism. In accordance with the above-mentioned access mechanism, the AP and/or STA may perform Clear Channel Assessment (CCA) for sensing an RF channel or medium during a predetermined time interval [for example, DCF Inter-Frame Space (DIFS)], prior to data transmission. If it is determined that the medium is in the idle state, frame transmission through the corresponding medium begins. On the other hand, if it is determined that the medium is in the occupied state, the corresponding AP and/or STA does not start its own transmission, establishes a delay time (for example, a random backoff period) for medium access, and attempts to start frame transmission after waiting for a predetermined time. Through application of a random backoff period, it is expected that multiple STAs will attempt to start frame transmission after waiting for different times, resulting in minimum collision.

In addition, IEEE 802.11 MAC protocol provides a Hybrid Coordination Function (HCF). HCF is based on DCF and Point Coordination Function (PCF). PCF refers to the polling-based synchronous access scheme in which periodic polling is executed in a manner that all reception (Rx) APs and/or STAs can receive the data frame. In addition, HCF includes Enhanced Distributed Channel Access (EDCA) and HCF Controlled Channel Access (HCCA). EDCA is achieved when the access scheme provided from a provider to a plurality of users is contention-based. HCCA is achieved by the contention-free-based channel access scheme based on the polling mechanism. In addition, HCF includes a medium access mechanism for improving Quality of Service (QoS) of WLAN, and may transmit QoS data in both a Contention Period (CP) and a Contention Free Period (CFP).

Figure 4:
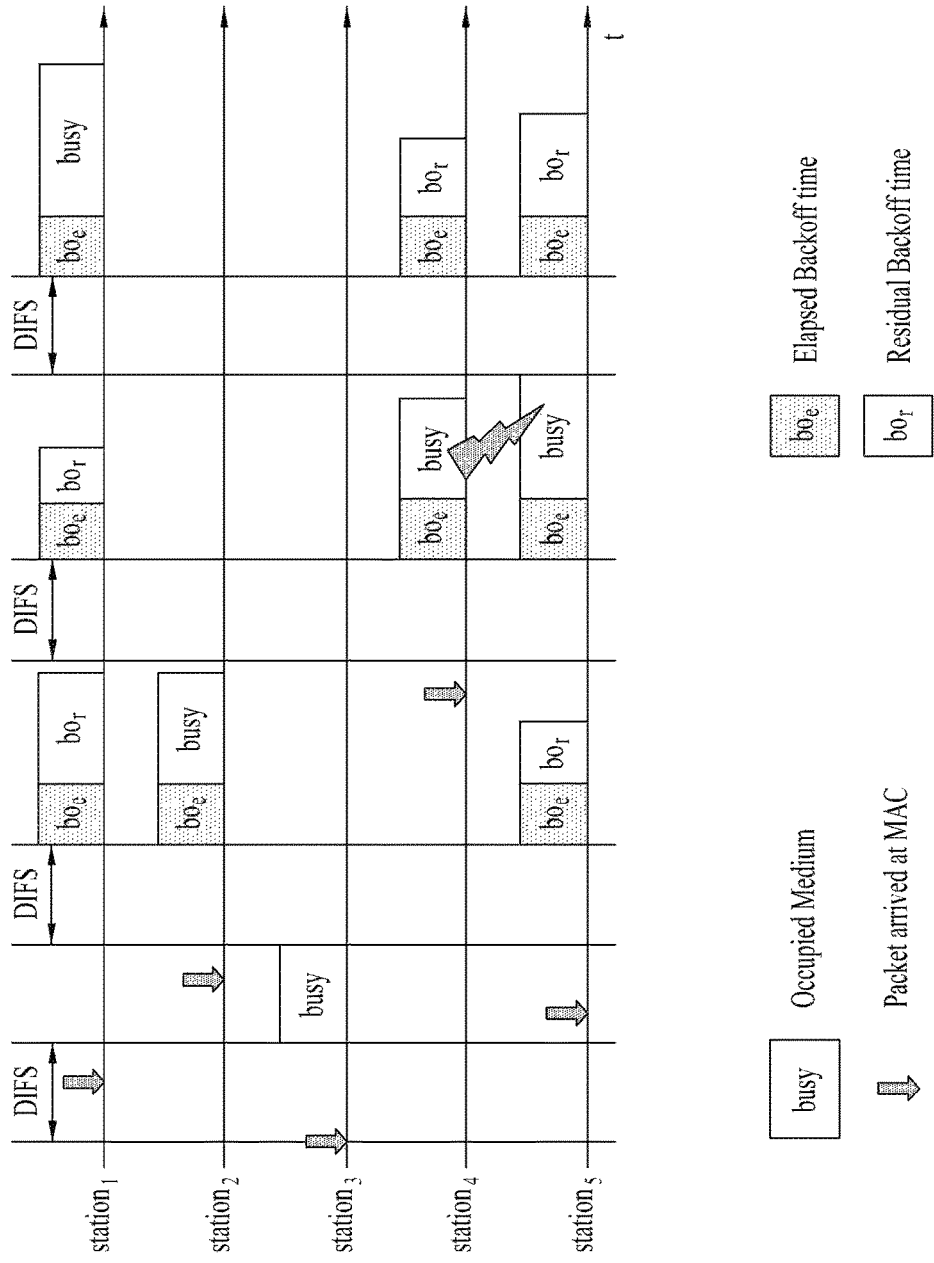
FIG. 4 illustrates a backoff procedure.

FIG. 4 is a conceptual diagram illustrating a backoff process.

Operations based on a random backoff period will hereinafter be described with reference to FIG. 4. If the occupy- or busy-state medium is shifted to an idle state, several STAs may attempt to transmit data (or frame). As a method for implementing a minimum number of collisions, each STA selects a random backoff count, waits for a slot time corresponding to the selected backoff count, and then attempts to start data transmission. The random backoff count has a value of a Packet Number (PN), and may be set to one of 0 to CW values. In this case, CW refers to a Contention Window parameter value. Although an initial value of the CW parameter is denoted by CWmin, the initial value may be doubled in case of a transmission failure (for example, in the case in which ACK of the transmission frame is not received). If the CW parameter value is denoted by CWmax, CWmax is maintained until data transmission is successful, and at the same time it is possible to attempt to start data transmission. If data transmission was successful, the CW parameter value is reset to CWmin. Preferably, CW, CWmin, and CWmax are set to $2^n-1$ (where n=0, 1, 2, . . . ).

If the random backoff process starts operation, the STA continuously monitors the medium while counting down the backoff slot in response to the decided backoff count value. If the medium is monitored as the occupied state, the countdown stops and waits for a predetermined time. If the medium is in the idle state, the remaining countdown restarts.

As shown in the example of FIG. 4, if a packet to be transmitted to MAC of STA3 arrives at the STA3, the STA3 determines whether the medium is in the idle state during the DIFS, and may directly start frame transmission. In the meantime, the remaining STAs monitor whether the medium is in the busy state, and wait for a predetermined time. During the predetermined time, data to be transmitted may occur in each of STA1, STA2, and STA5. If the medium is in the idle state, each STA waits for the DIFS time and then performs countdown of the backoff slot in response to a random backoff count value selected by each STA. The example of FIG. 4 shows that STA2 selects the lowest backoff count value and STA1 selects the highest backoff count value. That is, after STA2 finishes backoff counting, the residual backoff time of STA5 at a frame transmission start time is shorter than the residual backoff time of STA1. Each of STA1 and STA5 temporarily stops countdown while STA2 occupies the medium, and waits for a predetermined time. If occupying of the STA2 is finished and the medium re-enters the idle state, each of STA1 and STA5 waits for a predetermined time DIFS, and restarts backoff counting. That is, after the remaining backoff slot as long as the residual backoff time is counted down, frame transmission may start operation. Since the residual backoff time of STA5 is shorter than that of STA1, STA5 starts frame transmission. Meanwhile, data to be transmitted may occur in STA4 while STA2 occupies the medium. In this case, if the medium is in the idle state, STA4 waits for the DIFS time, performs countdown in response to the random backoff count value selected by the STA4, and then starts frame transmission. FIG. 4 exemplarily shows the case in which the residual backoff time of STA5 is identical to the random backoff count value of STA4 by chance. In this case, an unexpected collision may occur between STA4 and STA5. If the collision occurs between STA4 and STA5, each of STA4 and STA5 does not receive ACK, resulting in the occurrence of a failure in data transmission. In this case, each of STA4 and STA5 increases the CW value two times, and STA4 or STA5 may select a random backoff count value and then perform countdown. Meanwhile, STA1 waits for a predetermined time while the medium is in the occupied state due to transmission of STA4 and STA5. In this case, if the medium is in the idle state, STA1 waits for the DIFS time, and then starts frame transmission after lapse of the residual backoff time.

STA Sensing Operation

As described above, the CSMA/CA mechanism includes not only a physical carrier sensing mechanism in which the AP and/or STA can directly sense the medium, but also a virtual carrier sensing mechanism. The virtual carrier sensing mechanism can solve some problems (such as a hidden node problem) encountered in the medium access. For the virtual carrier sensing, MAC of the WLAN system can utilize a Network Allocation Vector (NAV). In more detail, by means of the NAV value, the AP and/or STA, each of which currently uses the medium or has authority to use the medium, may inform another AP and/or another STA for the remaining time in which the medium is available. Accordingly, the NAV value may correspond to a reserved time in which the medium will be used by the AP and/or STA configured to transmit the corresponding frame. AN STA having received the NAV value may prohibit medium access (or channel access) during the corresponding reserved time. For example, NAV may be set according to the value of a 'duration' field of the MAC header of the frame.

The robust collision detect mechanism has been proposed to reduce the probability of such collision, and as such a detailed description thereof will hereinafter be described with reference to FIGS. 7 and 8. Although an actual carrier sensing range is different from a transmission range, it is assumed that the actual carrier sensing range is identical to the transmission range for convenience of description and better understanding of the present invention.

Figure 5:
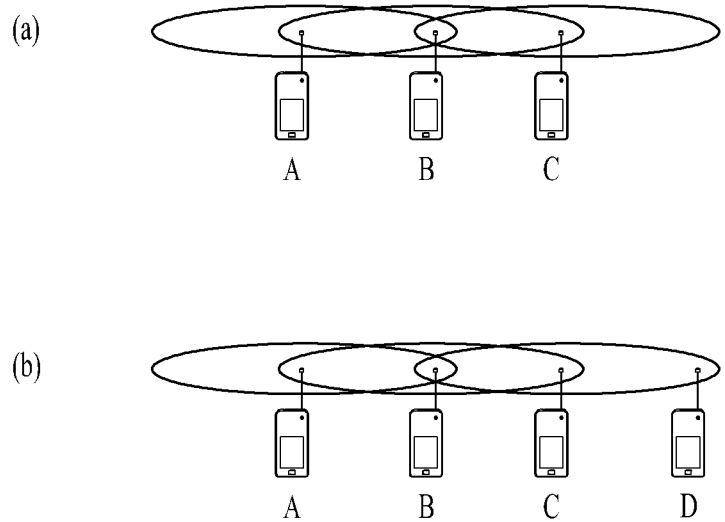
FIG. 5 is an explanatory diagram of a hidden node and an exposed node.

FIG. 5 is a conceptual diagram illustrating a hidden node and an exposed node.

FIG. 5(a) exemplarily shows the hidden node. In FIG. 5(a), STA A communicates with STA B, and STA C has information to be transmitted. In FIG. 5(a), STA C may determine that the medium is in the idle state when performing carrier sensing before transmitting data to STA B, under the condition that STA A transmits information to STA B. Since transmission of STA A (i.e., occupied medium) may not be detected at the location of STA C, it is determined that the medium is in the idle state. In this case, STA B simultaneously receives information of STA A and information of STA C, resulting in the occurrence of collision. Here, STA A may be considered as a hidden node of STA C.

FIG. 5(b) exemplarily shows an exposed node. In FIG. 5(b), under the condition that STA B transmits data to STA A, STA C has information to be transmitted to STA D. If STA C performs carrier sensing, it is determined that the medium is occupied due to transmission of STA B. Therefore, although STA C has information to be transmitted to STA D, the medium-occupied state is sensed, such that the STA C must wait for a predetermined time (i.e., standby mode) until the medium is in the idle state. However, since STA A is actually located out of the transmission range of STA C, transmission from STA C may not collide with transmission from STA B from the viewpoint of STA A, such that STA C unnecessarily enters the standby mode until STA B stops transmission. Here, STA C is referred to as an exposed node of STA B.

Figure 6:
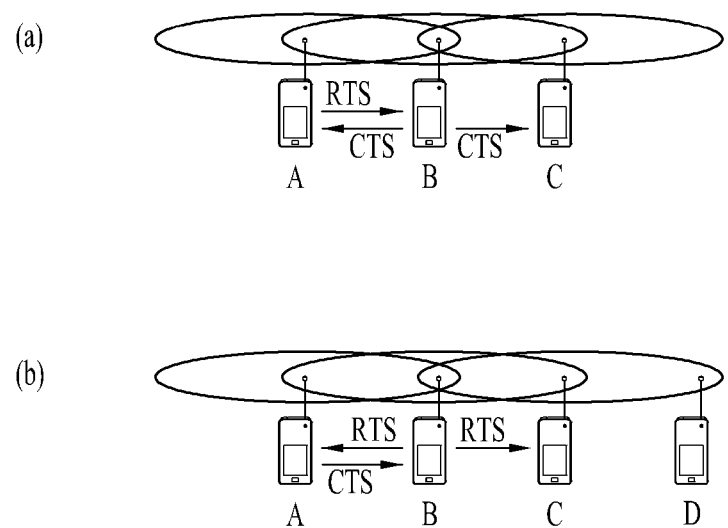
FIG. 6 is an explanatory diagram of RTS and CTS.

FIG. 6 is a conceptual diagram illustrating Request To Send (RTS) and Clear To Send (CTS).

In order to efficiently utilize the collision avoidance mechanism under the above-mentioned situation of FIG. 5, it is possible to use a short signaling packet such as RTS and CTS. RTS/CTS between two STAs may be overheard by peripheral STA(s), such that the peripheral STA(s) may consider whether information is communicated between the two STAs. For example, if STA to be used for data transmission transmits the RTS frame to the STA having received data, the STA having received data transmits the CTS frame to peripheral STAs, and may inform the peripheral STAs that the STA is going to receive data.

FIG. 6(a) exemplarily shows the method for solving problems of the hidden node. In FIG. 6(a), it is assumed that each of STA A and STA C is ready to transmit data to STA B. If STA A transmits RTS to STA B, STA B transmits CTS to each of STA A and STA C located in the vicinity of the STA B. As a result, STA C must wait for a predetermined time until STA A and STA B stop data transmission, such that collision is prevented from occurring.

FIG. 6(b) exemplarily shows the method for solving problems of the exposed node. STA C performs overhearing of RTS/CTS transmission between STA A and STA B, such that STA C may determine no collision although it transmits data to another STA (for example, STA D). That is, STA B transmits an RTS to all peripheral STAs, and only STA A having data to be actually transmitted can transmit a CTS. STA C receives only the RTS and does not receive the CTS of STA A, such that it can be recognized that STA A is located outside of the carrier sensing range of STA C.

Power Management

As described above, the WLAN system has to perform channel sensing before STA performs data transmission/reception. The operation of always sensing the channel causes persistent power consumption of the STA. There is not much difference in power consumption between the Reception (Rx) state and the Transmission (Tx) state. Continuous maintenance of the Rx state may cause large load to a power-limited STA (i.e., STA operated by a battery). Therefore, if STA maintains the Rx standby mode so as to persistently sense the channel, power is inefficiently consumed without special advantages in terms of WLAN throughput. In order to solve the above-mentioned problem, the WLAN system supports a Power Management (PM) mode of the STA.

The PM mode of the STA is classified into an active mode and a Power Save (PS) mode. The STA is basically operated in the active mode. The STA operating in the active mode maintains an awake state. If the STA is in the awake state, the STA may normally operate such that it can perform frame transmission/reception, channel scanning, or the like. On the other hand, STA operating in the PS mode is configured to switch from the doze state to the awake state or vice versa. STA operating in the sleep state is operated with minimum power, and the STA does not perform frame transmission/reception and channel scanning.

The amount of power consumption is reduced in proportion to a specific time in which the STA stays in the sleep state, such that the STA operation time is increased in response to the reduced power consumption. However, it is impossible to transmit or receive the frame in the sleep state, such that the STA cannot mandatorily operate for a long period of time. If there is a frame to be transmitted to the AP, the STA operating in the sleep state is switched to the awake state, such that it can transmit/receive the frame in the awake state. On the other hand, if the AP has a frame to be transmitted to the STA, the sleep-state STA is unable to receive the frame and cannot recognize the presence of a frame to be received. Accordingly, STA may need to switch to the awake state according to a specific period in order to recognize the presence or absence of a frame to be transmitted to the STA (or in order to receive a signal indicating the presence of the frame on the assumption that the presence of the frame to be transmitted to the STA is decided).

The AP may transmit a beacon frame to STAs in a BSS at predetermined intervals. The beacon frame may include a traffic indication map (TIM) information element. The TIM information element may include information indicating that the AP has buffered traffic for STAs associated therewith and will transmit frames. TIM elements include a TIM used to indicate a unicast frame and a delivery traffic indication map (DTIM) used to indicate a multicast or broadcast frame.

Figure 7:
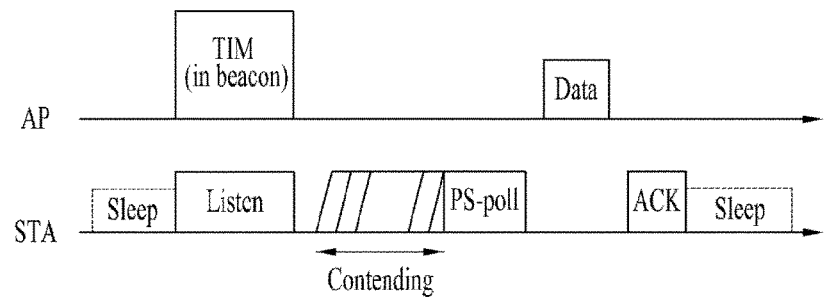
FIGS. 7 to 9 are explanatory diagrams of operation of an STA that has received TIM.
Figure 8:
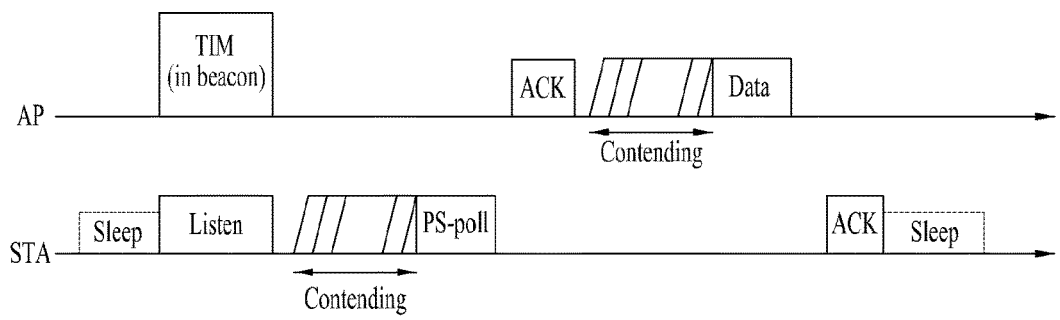
Figure 9:
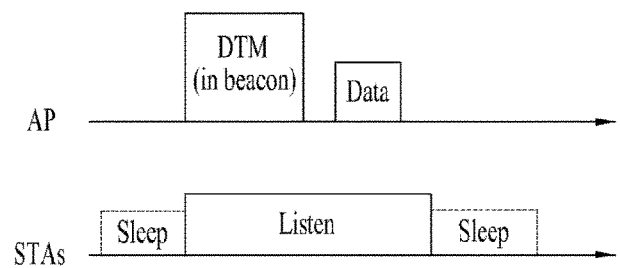

FIGS. 7 to 9 are conceptual diagrams illustrating detailed operations of the STA having received a Traffic Indication Map (TIM).

Referring to FIG. 7, STA is switched from the sleep state to the awake state so as to receive the beacon frame including a TIM from the AP. STA interprets the received TIM element such that it can recognize the presence or absence of buffered traffic to be transmitted to the STA. After STA contends with other STAs to access the medium for PS-Poll frame transmission, the STA may transmit the PS-Poll frame for requesting data frame transmission to the AP. The AP having received the PS-Poll frame transmitted by the STA may transmit the frame to the STA. STA may receive a data frame and then transmit an ACK frame to the AP in response to the received data frame. Thereafter, the STA may re-enter the sleep state.

As can be seen from FIG. 7, the AP may operate according to the immediate response scheme, such that the AP receives the PS-Poll frame from the STA and transmits the data frame after lapse of a predetermined time [for example, Short Inter-Frame Space (SIFS)]. In contrast, the AP having received the PS-Poll frame does not prepare a data frame to be transmitted to the STA during the SIFS time, such that the AP may operate according to the deferred response scheme, and as such a detailed description thereof will hereinafter be described with reference to FIG. 8.

The STA operations of FIG. 8 in which the STA is switched from the sleep state to the awake state, receives a TIM from the AP, and transmits the PS-Poll frame to the AP through contention are identical to those of FIG. 7. If the AP having received the PS-Poll frame does not prepare a data frame during the SIFS time, the AP may transmit the ACK frame to the STA instead of transmitting the data frame. If the data frame is prepared after transmission of the ACK frame, the AP may transmit the data frame to the STA after completion of such contending. STA may transmit the ACK frame indicating successful reception of a data frame to the AP, and may be shifted to the sleep state.

FIG. 9 shows the exemplary case in which AP transmits DTIM. STAs may be switched from the sleep state to the awake state so as to receive the beacon frame including a DTIM element from the AP. STAs may recognize that multicast/broadcast frame(s) will be transmitted through the received DTIM. After transmission of the beacon frame including the DTIM, AP may directly transmit data (i.e., multicast/broadcast frame) without transmitting/receiving the PS-Poll frame. While STAs continuously maintains the awake state after reception of the beacon frame including the DTIM, the STAs may receive data, and then switch to the sleep state after completion of data reception.

Frame Structure

Figure 10:
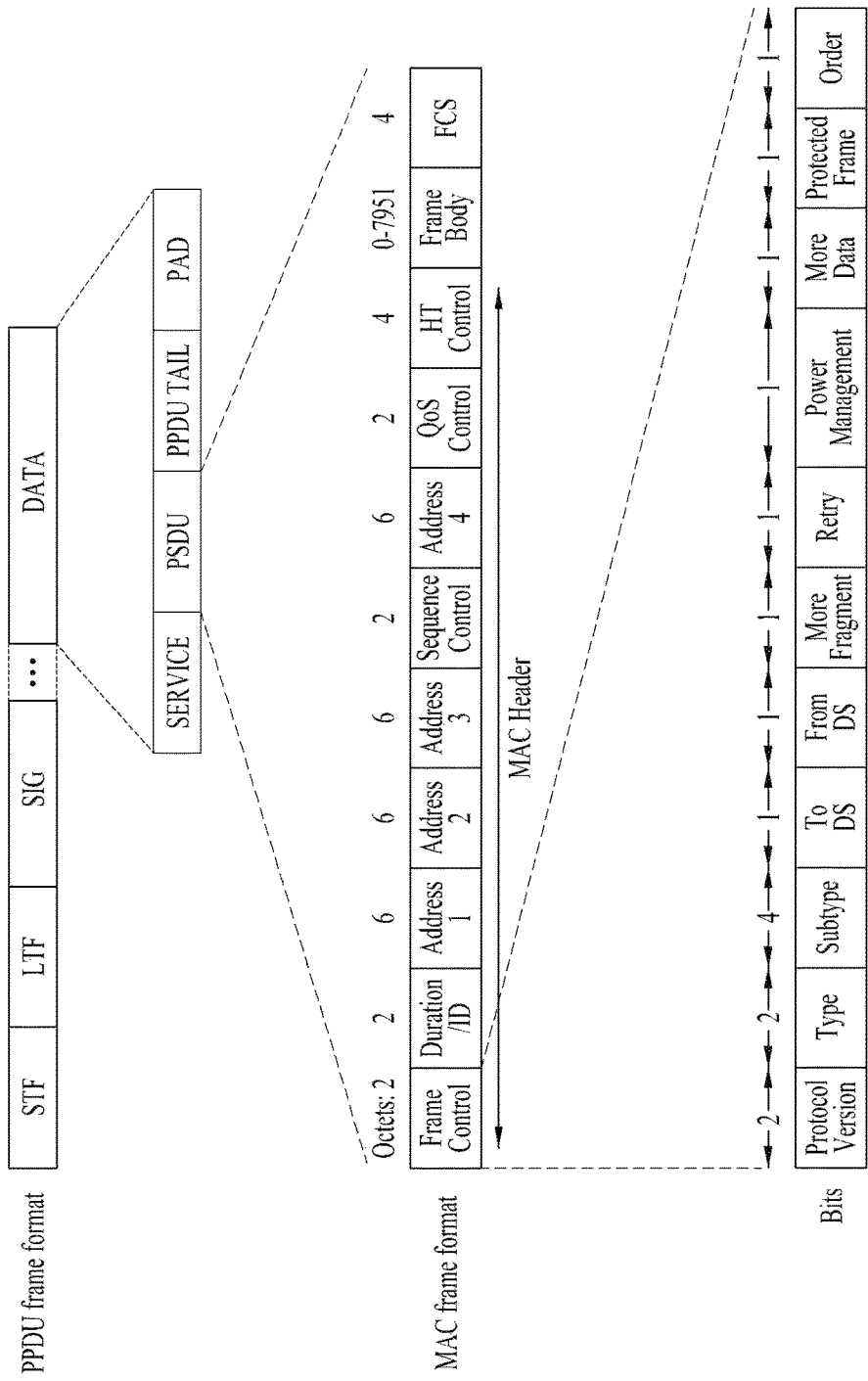
FIG. 10 is an explanatory diagram of an exemplary frame structure used in an IEEE 802.11 system.

FIG. 10 is an explanatory diagram of an exemplary frame structure used in an IEEE 802.11 system.

A PPDU (Physical Layer Protocol Data Unit) frame format may include an STF (Short Training Field), an LTF (Long Training Field), a SIG (SIGNAL) field and a data field. The most basic (e.g., non-HT (High Throughput)) PPDU frame format may include only an L-STF (Legacy-STF), an L-LTF (Legacy-LTF), a SIG field and a data field.

The STF is a signal for signal detection, AGC (Automatic Gain Control), diversity selection, accurate time synchronization, etc., and the LIT is a signal for channel estimation, frequency error estimation, etc. The STF and LTF may be collectively called a PLCP preamble. The PLCP preamble may be regarded as a signal for OFDM physical layer synchronization and channel estimation.

The SIG field may include a RATE field and a LENGTH field. The RATE field may include information about modulation and coding rates of data. The LENGTH field may include information about the length of data. In addition, the SIG field may include a parity bit, a SIG TAIL bit, etc.

The data field may include a SERVICE field, a PSDU (Physical layer Service Data Unit) and a PPDU TAIL bit. The data field may also include padding bits as necessary. Some bits of the SERVICE field may be used for synchronization of a descrambler at a receiving end. The PSDU corresponds to an MPDU (MAC Protocol Data Unit) defined in the MAC layer and may include data generated/used in a higher layer. The PPDU TAIL bit may be used to return an encoder to state 0. The padding bits may be used to adjust the length of the data field to a predetermined unit.

The MPDU is defined depending on various MAC frame formats, and a basic MAC frame includes a MAC header, a frame body and an FCS (Frame Check Sequence). The MAC frame may be composed of the MPDU and transmitted/received through PSDU of a data part of the PPDU frame format.

The MAC header includes a frame control field, a duration/ID field, an address field, etc. The frame control field may include control information necessary for frame transmission/reception. The duration/ID field may be set to a time to transmit a relevant a relevant frame.

The duration/ID field included in the MAC header may be set to a 16-bit length (e.g., B0 to B15). Content included in the duration/ID field may depend on frame type and sub-type, whether transmission is performed for a CFP (contention free period), QoS capability of a transmission STA and the like. (i) In a control frame corresponding to a sub-type of PS-Poll, the duration/ID field may include the AID of the transmission STA (e.g., through 14 LSBs) and 2 MSBs may be set to 1. (ii) In frames transmitted by a PC (point coordinator) or a non-QoS STA for a CFP, the duration/ID field may be set to a fixed value (e.g., 32768). (iii) In other frames transmitted by a non-QoS STA or control frames transmitted by a QoS STA, the duration/ID field may include a duration value defined per frame type. In a data frame or a management frame transmitted by a QoS STA, the duration/ID field may include a duration value defined per frame type. For example, B15=0 of the duration/ID field indicates that the duration/ID field is used to indicate a TXOP duration, and B0 to B14 may be used to indicate an actual TXOP duration. The actual TXOP duration indicated by B0 to B14 may be one of 0 to 32767 and the unit thereof may be microseconds (μs). However, when the duration/ID field indicates a fixed TXOP duration value (e.g., 32768), B15 can be set to 1 and B0 to B14 can be set to 0. When B14=1 and B15=1, the duration/ID field is used to indicate an AID, and B0 to B13 indicate one AID of 1 to 2007. Refer to the IEEE 802.11 standard document for details of Sequence Control, QoS Control, and FIT Control subfields of the MAC header.

The frame control field of the MAC header may include Protocol Version, Type, Subtype, To DS, From DS, More Fragment, Retry, Power Management, More Data, Protected Frame and Order subfields. Refer to the IEEE 802.11 standard document for contents of the subfields of the frame control field.

Figure 11:
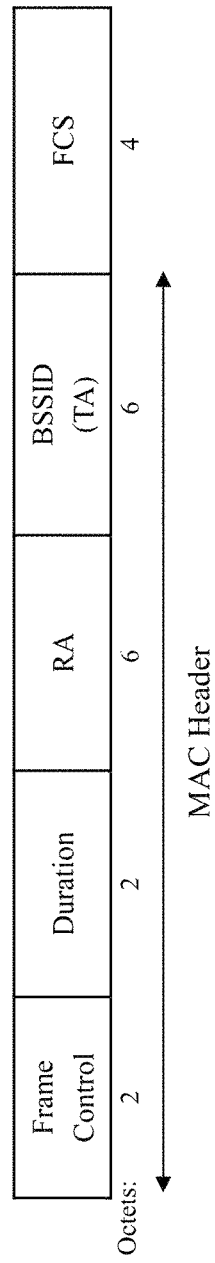
FIG. 11 illustrates a contention free (CF)-END frame.

FIG. 11 illustrates a CF (contention free)-END frame.

It is assumed that the CF-END frame is transmitted by a non-DMG (directional multi-gigabit, 11ad) STA for convenience of description. The CF-END frame may be transmitted to truncate a TXOP duration. Accordingly, a duration field is set to 0 in the CF-END frame. An RA (Receiver Address) field may be set to a broadcast group address. A BSSID field may be set to an STA address included in a relevant AP. However, in the case of a CF-END frame in a non-FIT or non-HT duplicate format, which is transmitted from a VHT STA to a VHT AP, an Individual/Group bit of the BSSID field may be set to 1.

Example of HE PPDU Structure

A description will be given of examples of an HE PPDU (High Efficiency Physical layer Protocol Data Unit) format in a wireless LAN system supporting 11ax.

Figure 12:
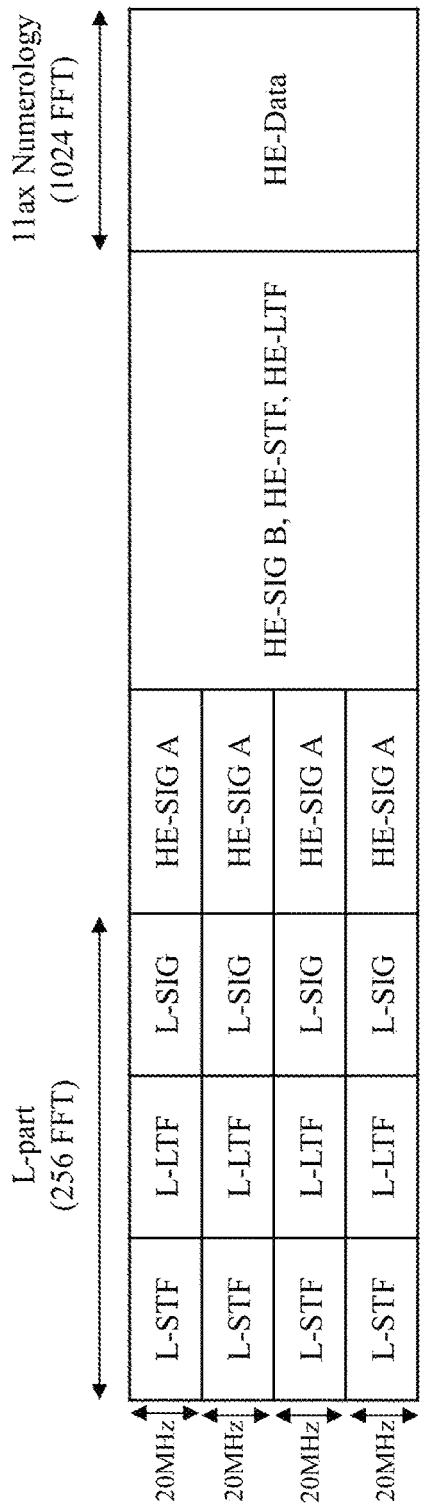
FIG. 12 illustrates an example of an HE PPDU.

FIG. 12 illustrates an example of the HE PPDU. Referring to FIG. 12, an HE-SIG A (or HE-SIG1) field follows an L-Part (e.g., L-STF, L-LTF, L-SIG) and is duplicated every 20 MHz like the L-Part. The HE-SIG A field includes common control information (e.g., BW, GI length, BSS index, CRC, Tail, etc.) for STAs. The HE-SIG A field includes information for decoding the HE PPDU and thus information included in the HE-SIG A field may depend on the format of the HE PPDU (e.g., SU PPDU, MU PPDU, trigger-based PPDU or the like). For example, in the HE SU PPDU format, the HE-SIG A field may include at least one of a DL/UL indicator, HE PPDU format indicator, BSS color, TXOP duration, BW (bandwidth), MCS,CP+LTF length, coding information, the number of streams, STBC (e.g., whether STBC is used), transmission beamforming (TxBF) information, CRC and Tail. In the case of the HE SU PPDU format, the HE-SIG B field may be omitted. In the HE MU PPDU format, the HE-SIG A field may include at least one of a DL/UL indicator, BSS color, TXOP duration, BW, MCS information of a SIG B field, the number of symbols of the SIG B field, the number of HE LTF symbols, indicator indicating whether full band MU-MIMO is used, CP+LTF length, transmission beamforming (TxBF) information, CRC and Tail. In the HE trigger-based PPDU format, an HE-SIG A field may include at least one of a format indicator (e.g., indicating the SU PPDU or trigger-based PPDU), BSS color, TXOP duration, BW, CRC and Tail.

Figure 13:
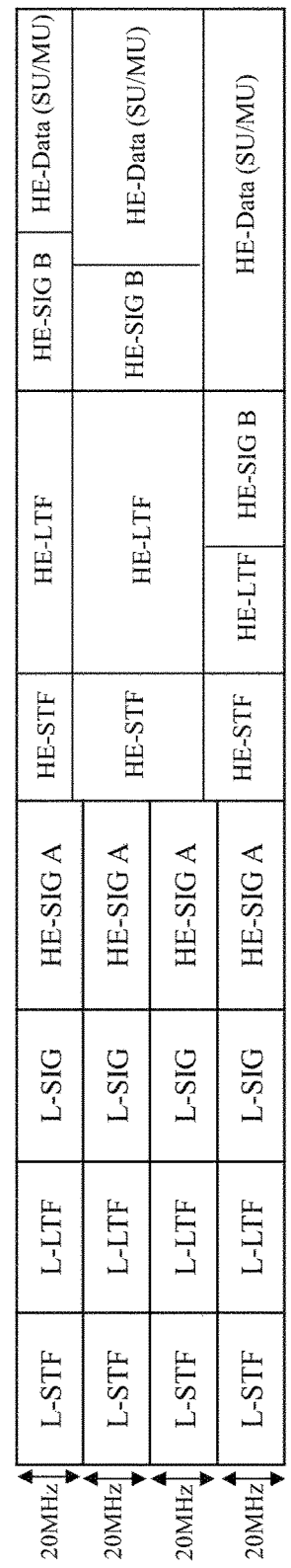
FIG. 13 illustrates another example of the HE PPDU.

FIG. 13 illustrates another example of the HE PPDU. Referring to FIG. 13, the HE-SIG A may include user allocation information, for example, at least one of an STA ID such as a PAID or a GID, allocated resource information and the number of streams (Nsts), in addition to the common control information. Referring to FIG. 13, the HE-SIG B (or HE-SIG2) may be transmitted for each OFDMA allocation. In the case of MU-MIMO, the HE-SIG B is identified by an STA through SDM. The HE-SIG B may include additional user allocation information, for example, an MCS, coding information, STBC (Space Time Block Code) information and transmission beamforming (TXBF) information.

Figure 14:
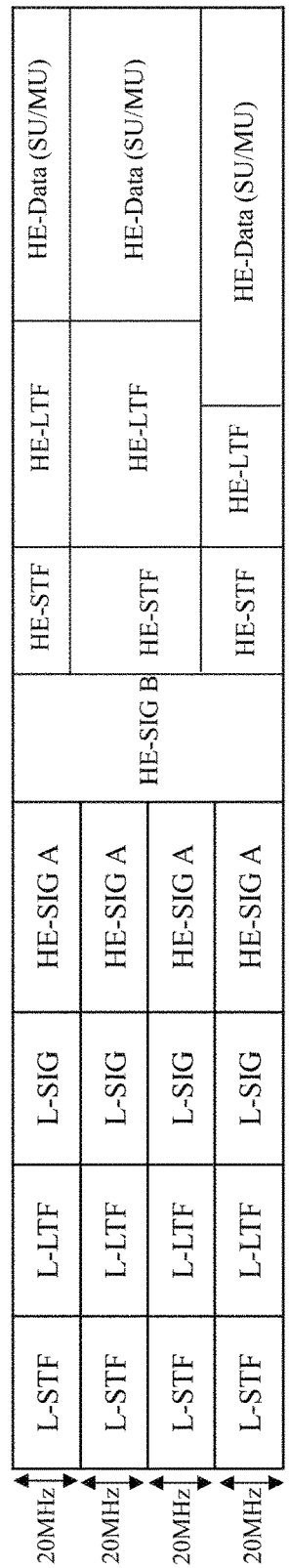
FIG. 14 illustrates another example of the HE PPDU.

FIG. 14 illustrates another example of the HE PPDU. The HE-SIG B is transmitted following the HE-SIG A. The HE-SIG B may be transmitted through the full band on the basis of numerology of the HE-SIG A. The HE-SIG B may include user allocation information, for example, STA AID, resource allocation information (e.g., allocation size), MCS, the number of streams (Nsts), coding, STBC and transmission beamforming (TXBF) information.

Figure 15:
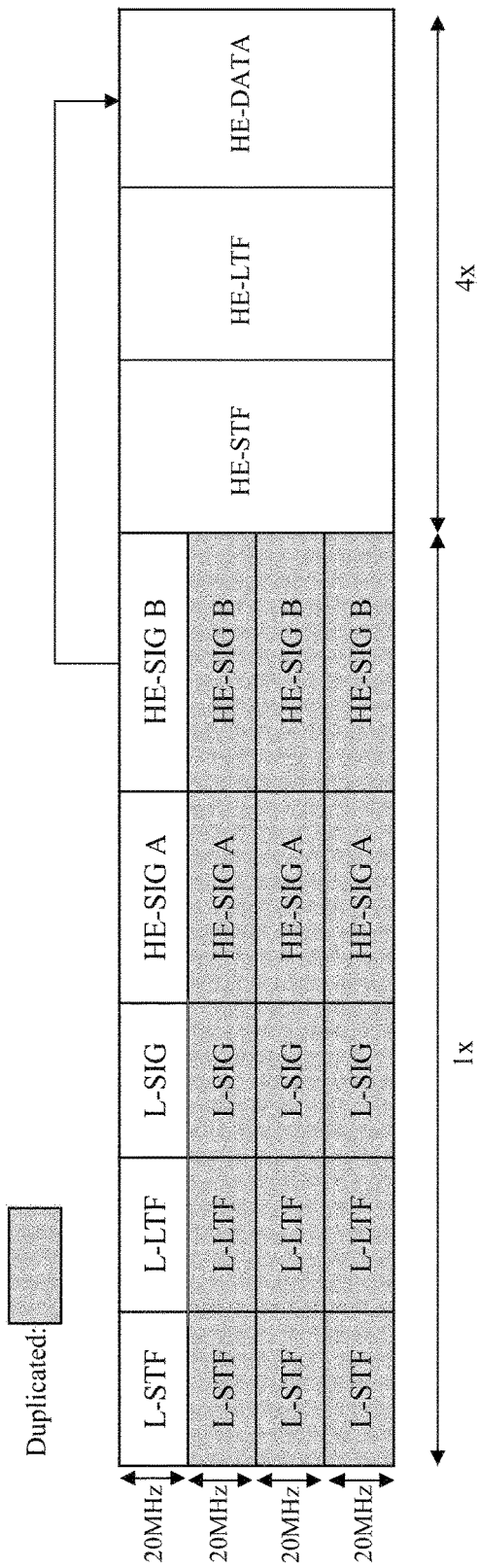
FIG. 15 illustrates another example of the HE PPDU.

FIG. 15 illustrates another example of the HE PPDU. The HE-SIG B may be duplicated per predetermined unit channel. Referring to FIG. 15, the HE-SIG B may be duplicated per 20 MHz. For example, the HE-SIG B can be transmitted in such a manner that the same information is duplicated per 20 MHz in 80 MHz bandwidth.

An STA/AP which has received the HE-SIG B duplicated every 20 MHz may accumulate the received FIE-SIG B per 20 MHz channel to improve reliability of HE-SIG B reception.

Since the same signal (e.g., HE-SIG B) is duplicated and transmitted per channel, the gain of accumulated signals is proportional to the number of channels over which the signal is duplicated and transmitted to improve reception performance. In theory, a duplicated and transmitted signal can have a gain corresponding to 3 dB×(the number of channels) compared to the signal before duplication. Accordingly, the duplicated and transmitted HE-SIG B may be transmitted with an increased MCS level depending on the number of channels through which the HE-SIG B is duplicated and transmitted. For example, if MCS0 is used for the HE-SIG B transmitted without being duplicated, MCS1 can be used for the HE-SIG B duplicated and transmitted. Since the HE-SIG B can be transmitted with a higher MCS level as the number of channels for duplication increases, HE-SIG B overhead per unit channel can be reduced.

Figure 16:
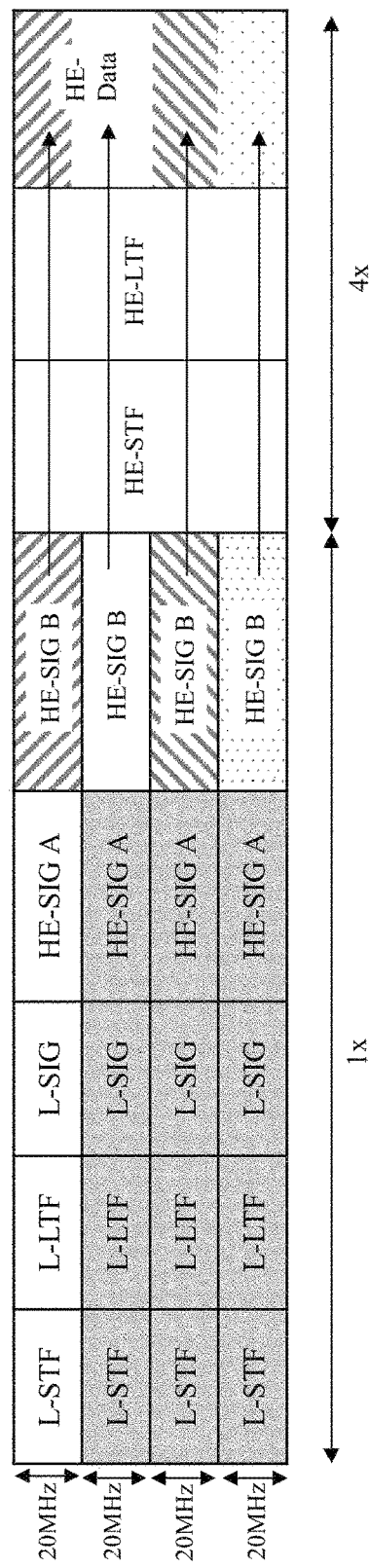
FIG. 16 illustrates another example of the HE PPDU.

FIG. 16 illustrates another example of the HE PPDU. Referring to FIG. 16, the HE-SIG B may include independent information per 20 MHz channel. The HE-SIG B may be transmitted in a 1× symbol structure like the Legacy part (e.g., L-STF, L-LTF, L-SIG) and HE-SIG A. Meanwhile, a length of "L-STF+L-LTF+L-SIG+FLE-SIGA+HE-SIGB" needs to be identical in all channels in a wide bandwidth. The HE-SIG B transmitted per 20 MHz channel may include allocation information about the corresponding band, for example, allocation information per user using the corresponding band, user ID, etc. However, the information of the HE-SIG B may vary between bands because the respective bands support different numbers of users and use different resource block configurations. Accordingly, the length of the HE-SIG B may be different for respective channels.

Figure 17:
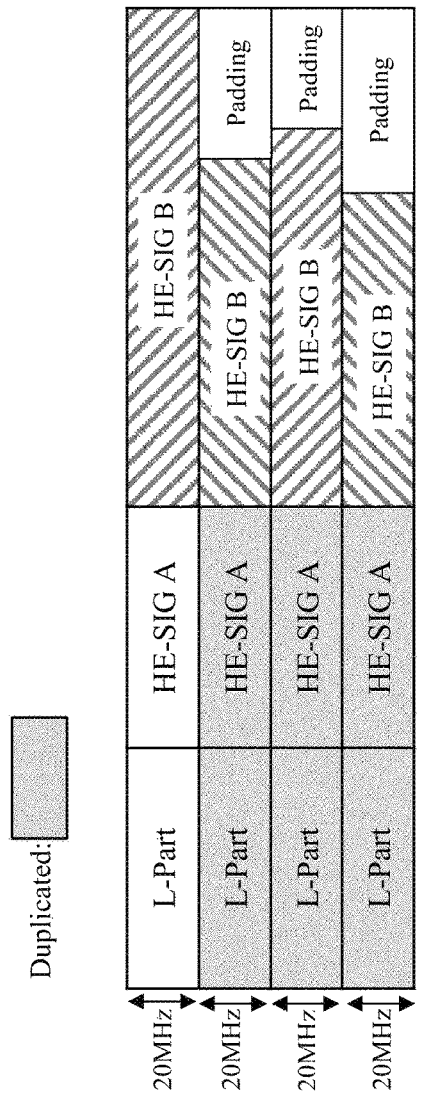
FIGS. 17 and 18 illustrating an HE-SIG B padding method.
Figure 18:

FIG. 17 illustrates an HE-SIG B padding method by which lengths before HE-STF (e.g., lengths to the HE-SIG B) become identical for respective channels. For example, the HE-SIG B may be duplicated by a padding length to align HE-SIG B lengths. As illustrated in FIG. 18, the HE-SIG B corresponding to a necessary padding length may be padded to the HE-SIG B from the start (or end) of the HE-SIG B.

According to an example, one HE-SIG B field can be transmitted when the bandwidth does not exceed 20 MHz. When the bandwidth exceeds 20 MHz, 20 MHz channels may respectively transmit one of a first type HE-SIG B (referred to hereinafter as HE-SIG B [1]) and a second type HE-SIG B (referred to hereinafter as HE-SIG B [2]). For example, HE-SIG B [1] and HE-SIG B [2] may be alternately transmitted. An odd-numbered 20 MHz channel may deliver HE-SIG B [1] and an even-numbered 20 MHz channel may deliver HE-SIG B [2]. More specifically, in the case of a 40 MHz bandwidth, HE-SIG B [1] is transmitted over the first 20 MHz channel and HE-SIG B [2] is transmitted over the second 20 MHz channel. In the case of an 80 MHz bandwidth, HE-SIG B [1] is transmitted over the first 20 MHz channel, HE-SIG B [2] is transmitted over the second 20 MHz channel, the same HE-SIG B [1] is duplicated and transmitted over the third 20 MHz channel and the same HE-SIG B [2] is duplicated and transmitted over the fourth 20 MHz channel. The HE-SIG B is transmitted in a similar manner in the case of a 160 MHz bandwidth.

As described above, the HE-SIG B can be duplicated and transmitted as the bandwidth increases. Here, a duplicated HE-SIG B may be frequency-hopped by 20 MHz from a 20 MHz channel over which an HE-SIG B of the same type is transmitted and transmitted.

HE-SIG B [1] and HE-SIG B [2] may have different content. However, HE-SIG-Bs [1] have the same content. Similarly, HE-SIG Bs [2] have the same content.

According to an embodiment, HE-SIG B [1] may be configured to include resource allocation information about only odd-numbered 20 MHz channels and HE-SIG B [2] may be configured to include resource allocation information about only even-numbered 20 MHz channels. According to another embodiment of the present invention, HE-SIG B [1] may include resource allocation information about at least part of even-numbered 20 MHz channels or HE-SIG B [2] may include resource allocation information about at least part of odd-numbered 20 MHz channels.

The HE-SIG B may include a common field and a user-specific field. The common field may precede the user-specific field. The common field and the user-specific field may be distinguished in a unit of bit(s) instead of a unit of OFDM symbol(s).

The common field of the HE-SIG B includes information for all STAs designated to receive PPDUs in a corresponding bandwidth. The common field may include resource unit (RU) allocation information. All the HE-SIG Bs [1] may have the same content and All the HE-SIG Bs [2] may have the same content. For example, when four 20 MHz channels constituting 80 MHz are classified as [LL, LR, RL, RR], the common field of HE-SIG B [1] may include a common block for LL and RL and the common field of HE-SIG B [2] may include a common block for LR and RR.

The user-specific field of the HE-SIG B may include a plurality of user fields. Each user field may include information specific to an individual STA designated to receive PPDUs. For example, the user field may include at least one of an STA ID, MCS per STA, the number of streams (Nsts), coding (e.g., indication of use of LDPC), DCM indicator and transmission beamforming information. However, the information of the user field is not limited thereto.

UL MU Transmission

Figure 19:
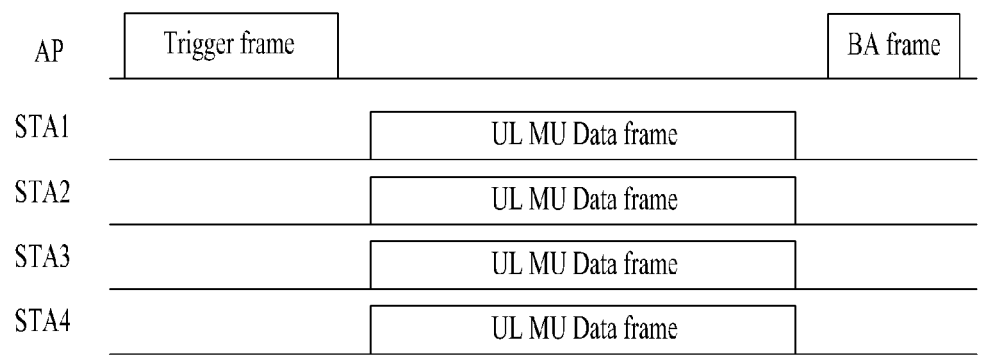
FIG. 19 is an explanatory diagram of uplink multi-user transmission according to an embodiment of the present invention.

FIG. 19 is an explanatory diagram of an uplink multi-user transmission situation according to an embodiment of the present invention.

As described above, an 802.11ax system may employ UL MU transmission. UL MU transmission may be started when an AP transmits a trigger frame to a plurality of STAs (e.g., STA1 to STA4), as illustrated in FIG. 19. The trigger frame may include UL MU allocation information. The UL MU allocation information may include at least one of resource position and size, STA IDs or reception STA addresses, MCS and MU type (MIMO, OFDMA, etc.). Specifically, the trigger frame may include at least one of (i) a UL MU frame duration, (ii) the number of allocations (N) and (iii) information per allocation. The information per allocation may include information per user (Per user Info). The information per allocation may include at least one of an AID (AIDs corresponding to the number of STAs are added in the case of MU), power adjustment information, resource (or tone) allocation information (e.g., bitmap), MCS, the number of streams (Nsts), STBC, coding and transmission beamforming information.

As illustrated in FIG. 19, the AP may acquire TXOP to transmit the trigger frame through a contention procedure to access media. Accordingly, the STAs may transmit UL data frames in a format indicated by the AP after SIFS of the trigger frame. It is assumed that the AP according to an embodiment of the present invention sends an acknowledgement response to the UL data frames through a block ACK (BA) frame.

Figure 20:
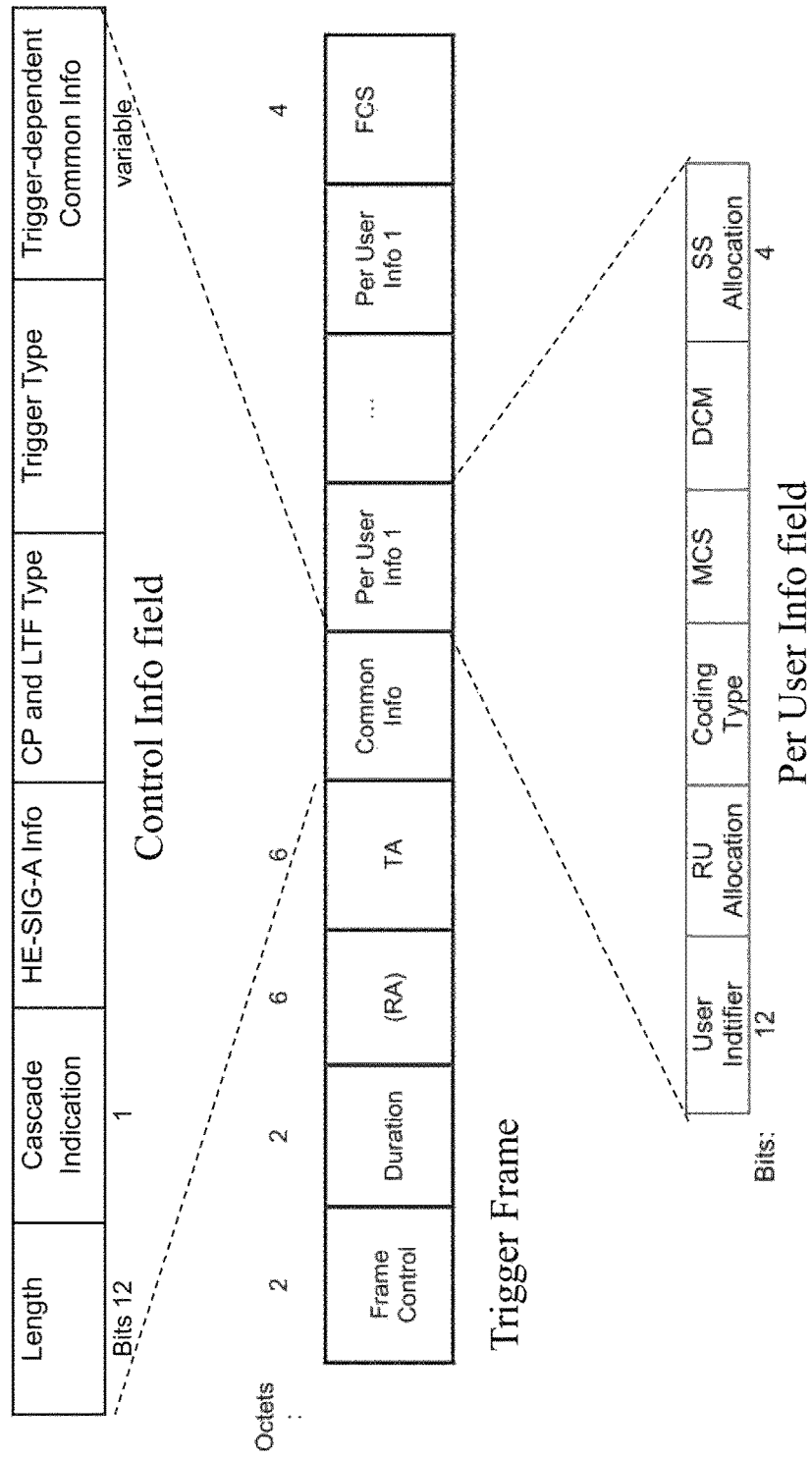
FIG. 20 illustrates a trigger frame format according to an embodiment of the present invention.

FIG. 20 illustrates a trigger frame format according to an embodiment.

Referring to FIG. 20, the trigger frame may include at least one of a frame control field, a duration field, an RA (recipient STA address) field, a TA (transmitting STA address) field, a common information field, one or more Per User Info fields and FCS (Frame Check Sum). The RA field indicates the address or ID of a recipient STA and may be omitted according to embodiments. The TA field indicates the address of a transmitting STA.

The common information field may include at least one of a length subfield, a cascade indication subfield, an HE-SIG A information subfield, a CP/LTF type subfield, a trigger type subfield and a trigger-dependent common information subfield. The length subfield indicates the L-SIG length of a UL MU PPDU. The cascade indication indicates whether there is transmission of a subsequent trigger frame following the current trigger frame. The HE-SIG A information subfield indicates content to be included in the HE-SIG A of the UL MU PPDU. The CP/LTF type subfield indicates a CP and HE LTF type included in the UL MU PPDU. The trigger type subfield indicates the type of the trigger frame. The trigger frame may include common information specific to the type and information per user (Per User Info) specific to the type. For example, the trigger type may be set to one of a basic trigger type (e.g., type 0), beamforming report poll trigger type (e.g., type 1), MU-BAR (Multi-user Block Ack Request) type (e.g., type 2) and MU-RTS (multi-user ready to send) type (e.g., type 3). However the trigger type is not limited thereto. When the trigger type is MU-BAR, the trigger-dependent common information subfield may include a GCR (Groupcast with Retries) indicator and a GCR address.

The Per User Info field may include at least one of a user ID subfield, an RU allocation subfield, a coding type subfield, an MCS subfield, a DCM (dual sub-carrier modulation) subfield, an SS (spatial stream) allocation subfield and a trigger dependent Per User Info subfield. The user ID subfield indicates the AID of an STA which will use a corresponding resource unit to transmit MPDU of the UL MU PPDU. The RU allocation subfield indicates a resource unit used for the STA to transmit the UL MU PPDU. The coding type subfield indicates the coding type of the UL MU PPDU transmitted by the STA. The MCS subfield indicates the MCS of the UL MU PPDU transmitted by the STA. The DCM subfield indicates information about double carrier modulation of the UL MU PPDU transmitted by the STA. The SS allocation subfield indicates information about spatial streams of the UL MU PPDU transmitted by the STA. In the case of MU-BAR trigger type, the trigger-dependent Per User Info subfield may include BAR control and BAR information.

NAV (Network Allocation Vector)

A NAV may be understood as a timer for protecting TXOP of a transmitting STA (e.g., TXOP holder). An STA may not perform channel access during a period in which a NAV configured in the STA is valid so as to protect TXOP of other STAs.

A current non-DMG STA supports one NAV. An STA which has received a valid frame can update the NAV through the duration field of the PSDU (e.g., the duration field of the MAC header). When the RA field of the received frame corresponds to the MAC address of the STA, however, the STA does not update the NAV. When a duration indicated by the duration field of the received frame is greater than the current NAV value of the STA, the STA updates the NAV through the duration of the received frame.

Figure 21:
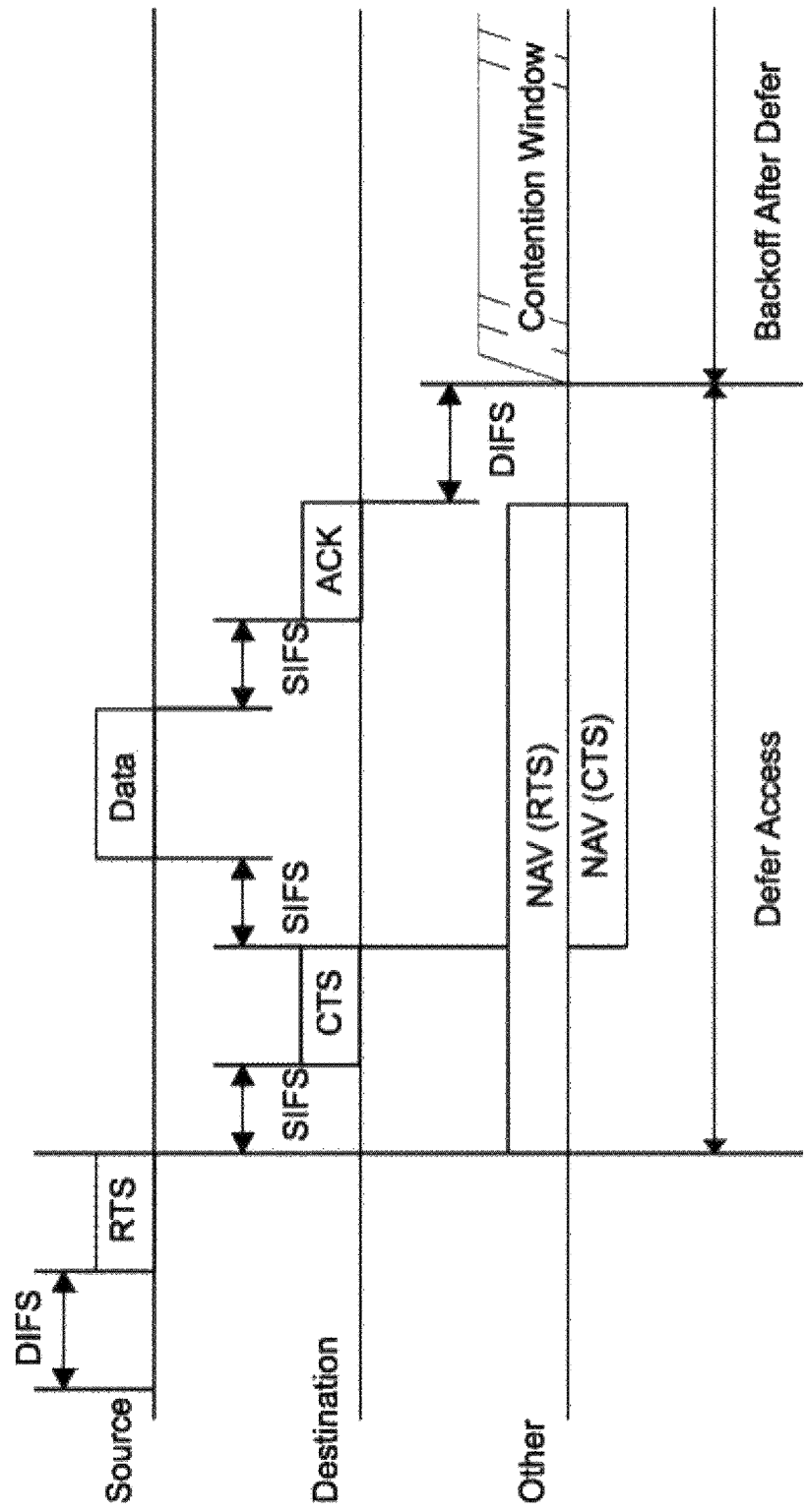
FIG. 21 illustrates an example of NAV setting.

FIG. 21 illustrates an example of NAV setting.

Referring to FIG. 21, a source STA transmits an RTS frame and a destination STA transmits CTS frame. As described above, the destination STA designated as a recipient through the RTS frame does not set a NAV. Some of other STAs may receive the RTS frame and set NAVs and others may receive the CTS frame and set NAVs.

If the CTS frame (e.g., PHY-RXSTART.indication primitive) is not received within a predetermined period from a timing when the RTS frame is received (e.g., PHY-RXEND. indication primitive for which MAC corresponds to the RTS frame is received), STAs which have set or updated NAVs through the RTS frame can reset the NAVs (e.g., 0). The predetermined period may be (2*aSIFSTime+CTS_Time+aRxPHYStartDelay+2*aSlotTime). The CTS_Time may be calculated on the basis of the CTS frame length indicated by the RTS frame and a data rate.

Although FIG. 21 illustrates setting or update of a NAV through the RTS frame or CTS frame for convenience, NAV setting/resetting/update may be performed on the basis of duration fields of various frames, for example, non-FIT PPDU, HT PPDU, VHT PPDU and HE PPDU (e.g., the duration field of the MAC header of the MAC frame). For example, if the RA field of the received MAC frame does not correspond to the address of an STA (e.g., MAC address), the STA may set/reset/update the NAV.

TXOP (Transmission Opportunity) Truncation

Figure 22:
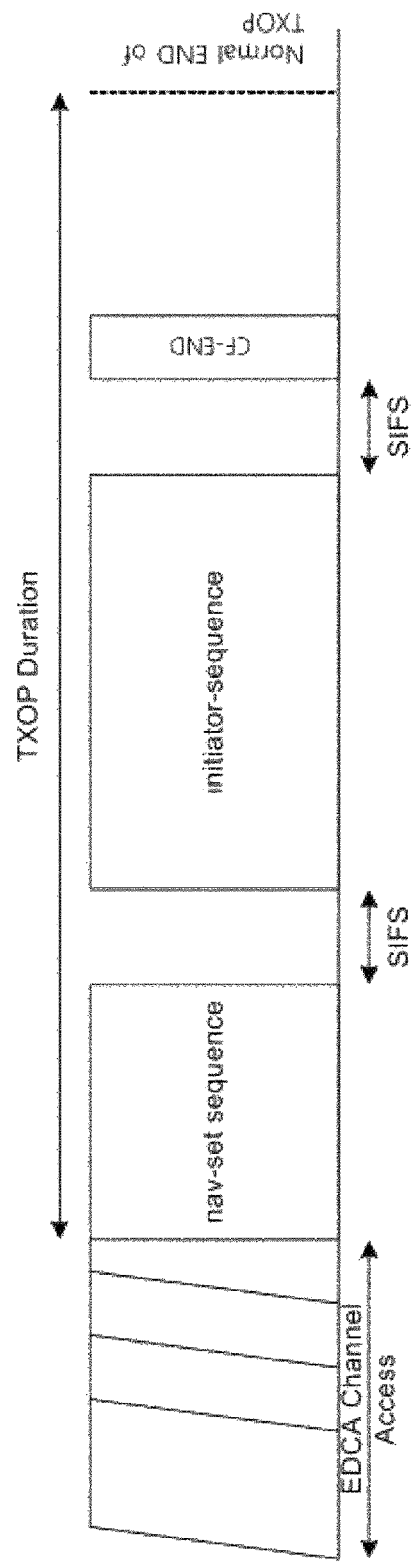
FIG. 22 illustrates an example of TXOP truncation.

FIG. 22 illustrates an example of TXOP truncation.

A TXOP holder STA may indicate to truncate TXOP by transmitting a CF-END frame. AN STA can reset the NAV (e.g., set the NAV to 0) upon reception of a CF-END frame or CF-END+CF-ACK frame.

When an STA that has acquired channel access through EDCA empties a transmission queue thereof, the STA can transmit a CF-END frame. The STA can explicitly indicate completion of TXOP thereof through transmission of the CF-END frame. The CF-END frame may be transmitted by a TXOP holder. A non-AP STA that is not a TXOP holder cannot transmit the CF-END frame. A STA which has received the CF-END frame resets the NAV at a time when a PPDU included in the CF-END frame is ended.

Referring to FIG. 22, an STA that has accessed a medium transmits a sequence (e.g., RTS/CTS) for NAV setting. After SIFS, a TXOP holder (or TXOP initiator) and a TXOP responder transmit and receive PPDUs (e.g,., initiator sequence). The TXOP holder truncates a TXOP by transmitting a CF-END frame when there is no data to be transmitted within the TXOP.

STAs which have received the CF-END frame reset NAVS thereof and can start contending for medium access without delay.

As described above, a TXOP duration is set through the duration field of the MAC header in the current wireless LAN system. That is, a TXOP holder (e.g., Tx STA) and a TXOP responder (e.g., Rx STA) include whole TXOP information necessary for transmission and reception of frames in duration fields of frames transmitted and received therebetween and transmit the frames. Third party STAs other than the TXOP holder and the TXOP responder check the duration fields of frames exchanged between the TXOP holder and the TXOP responder and set/update NAVs to defer use of channels until NAV periods.

In an 11ax system supporting the HE PPDU, the third party STAs cannot decode an MPDU included in a UL MU PPDU even when they receive the UL MU PPDU if the UL MU PPDU does not include the HE-SIG B. If the third party STAs cannot decode the MPDU, the third party STAs cannot acquire TXOP duration information (e.g., duration field) included in the MAC header of the MPDU. Accordingly, it is difficult to correctly perform NAV setting/update.

Even when an HE PPDU frame including the HE-SIG B is received, if the HE-SIG B structure is differently encoded per STA and is designed such that a STA can read only HE-SIG B content allocated to that STA, the third party STAs cannot decode a MAC frame (e.g., an MPDU in the HE PPDU corresponding to other STAs) transmitted and received by other STAs. Accordingly, the third party STAs cannot acquire TXOP information in this case.

● Indication of TXOP Duration through HE-SIG A

To solve the above-described problems, a method in which an STA transmits the TXOP duration information in an HE-SIG A field is proposed. As described above, 15 bits (e.g., B0 to B14) in the duration field of the MAC header may indicate duration information capable of indicating a maximum of about 32.7 ms (0 to 32767 μs). If the 15-bit duration information included in the duration field of the MAC header is transmitted in the HE-SIG A field, an 11ax third party STA may correctly set/update the NAV but signaling overhead of HE-SIG A excessively increases. Although 15 bits in an MPDU for payload transmission in a MAC layer may be relatively small in size, since the HE-SIG A field for transmitting common control information in a physical layer is compactly designed, increase of 15 bits in the HE-SIG A field causes relatively significant signaling overhead.

Accordingly, an embodiment of the present invention proposes an efficient TXOP duration indication method of minimizing overhead of the HE-SIG A field. In addition, a frame transmission and reception operation based on a newly defined TXOP duration in the HE-SIG A field is proposed. Hereinafter, the duration field included in the MAC header may be referred to as a MAC duration, for convenience.

While it is assumed in an embodiment described hereinbelow that the TXOP duration information is transmitted in the HE-SIG A field, the scope of the present invention is not limited thereto and may also be transmitted through other parts (e.g., parts of L-SIG, HE-SIG B, HE-SIG C, . . . , Aggregate-MPDU (A-MPDU), and MPDU). For example, when the TXOP duration information is transmitted through the HE-SIG B field, the TXOP duration information may be transmitted through a part of transmitting common information (e.g., a common part) of the HE-SIG B field or through an SIG-B content part (e.g., a Per user Info field) transmitted in the first (or last) part in the HE-SIG B field.

Hereinafter, the structure of the TXOP duration in the HE-SIG field and embodiments indicating the TXOP duration will be described. A value set as a NAV of a third party STA may be interpreted as a TXOP duration of a TXOP holder/responder. For example, a duration field value is a TXOP for frame transmission and reception in terms of the TXOP holder/responder but means a NAV value in terms of the third party STA. Accordingly, since an operation in which third party STAs set/update a NAV is to set the NAV corresponding to the TXOP of the TXOP holder/responder, the operation in which the third party STAs set/update the NAV may be referred to as a TXOP setting/update operation, for convenience. In addition, the term "TXOP duration" may be simplified to a "duration" or may be simply referred to as a TXOP. In some cases, the TXOP duration may be used to refer to a field (e.g., a TXOP duration field in HE-SIG A) in a field or may be used to refer to an actual TXOP duration value.

In embodiments described hereinbelow, indexes are allocated for convenience of description. Therefore, embodiments described as having other indexes may be combined to be implemented as one invention or each of the embodiments described as having other indexes may be implemented as an individual invention.

Embodiment 1

The TXOP duration may be set to $2^N-1$ (or $2^N$). For convenience, it is assumed that the TXOP duration is set to $2^N-1$. The value of N may be transmitted in the TXOP duration field of HE-SIG A.

For example, if N is 4 bits in size, N has a value of 0 to 15. Therefore, the TXOP duration indicated by N of a 4-bit size may have a value of 0 to 32767 μs. Unlike this, if the TXOP duration is set to indicate a maximum of 5 ms, N having a value of only 0 to 13 may be used to indicate the TXOP duration and N having a value of 14 and 15 may be used for other purposes.

The present embodiment exemplifies a method of indicating the TXOP duration using a scheme of $X*2^Y-1$ (e.g., X=1). X and/or Y may be changed in various manners. Values of X and Y may be transmitted through the HE-SIG A field. For example, it may be appreciated that X is a unit or granularity of a TXOP duration value. Since X is variable, it may be appreciated that multiple granularities are used.

Embodiment 2

According to an embodiment of the present invention, the TXOP duration may be set to $X^Y-1$ (or $X^Y$). For convenience, it is assumed that the TXOP duration is set to $X^Y-1$. An STA may transmit the values of X and Y through the TXOP duration field (e.g., in HE-SIG A).

Assuming that the TXOP duration field transmitted in the FIE-SIG A field is a total of K bits, n bits (e.g., front n bits) among the K bits may indicate the value of X and m bits (e.g., back m bits) may indicate the value of Y. The n bits may be n most significant bits (MSBs) or n least significant bits (LSBs) and the m bits may be m LSBs or m MSBs. The values of K, m, and n may be set in various manners.

(i) As an example, it is assumed that K=6, n=3, and m=3. X may be an integer of $X \in \{29\}$ and Y may be an integer of $Y \in \{0{\sim}7\}$. In this case, the TXOP duration has a value of 0 to 4782968 μs.

(ii) As another example, it is assumed that K=5, n=2, and m=3. X may be an integer of $X \in \{25\}$ and Y may be an integer of $Y \in \{0{\sim}7\}$. In this case, the TXOP duration has a value of 0 to 78124 μs. Unlike this, if X is an integer of $X \in \{2, 3, 5, 6\}$ and Y is an integer of $Y \in \{0{\sim}7\}$, the TXOP duration has a value of 0 to 78124 μs.

(iii) As still another example, it is assumed that K=4, n=1, and m=3. X may be an integer of $X \in \{2, 3\}$ (or $X \in \{5, 6\}$) and Y may be an integer of $Y \in \{7\}$. Then, the TXOP duration has a value of 0 to 279963 μs.

If it is desired to indicate up to P ms (e.g., 5 ms) through the TXOP duration field (e.g., in HE-SIG A), a combination of (X, Y) having a minimum of $X^Y-1$ among combinations of (X, Y) satisfying $X^Y-1 \geq P$ ms (e.g., 5 ms) may be used to indicate a maximum TXOP duration value and the other combinations of (X, Y) may not be used.

This embodiment exemplifies a method of indicating the TXOP duration using a scheme of $Z * X^Y-1$. X, Y, and/or Z may be changed in various manners. For example, it may be appreciated that X and/or Z is a unit or granularity of a TXOP duration value. Since X and/or Z is variable, it may be appreciated that multiple granularities are used.

Embodiment 3

According to an embodiment of the present invention, the TXOP duration may be set to $X * 2^Y-1$ (or $X* 2^Y$). The values of X and Y may be transmitted through the TXOP duration field.

Assuming that the TXOP duration field transmitted in the HE-SIG A field is a total of K bits, n bits (e.g., front n bits) among the K bits may indicate the value of X and m bits (e.g., back m bits) may indicate the value of Y. The n bits may be n MSBs or n LSBs and the m bits may be m LSBs or m MSBs. The values of K, m, and n may be set in various manners.

For example, assuming that K=6, n=3, and m=3, X may be one of $X \in \{1, 5, 10, 20, 30, 40, 50, 60\}$ and Y may be an integer of $Y \in \{0{\sim}7\}$. In this case, the TXOP duration has a value of 0 to 7680 μs.

If it is desired to indicate up to P ms (e.g., 5 ms) through the TXOP duration field (e.g., in HE-SIG A), a combination of (X, Y) having a minimum of $X * 2^Y-1$ among combinations of (X, Y) satisfying $X * 2^Y-1 \geq P$ ms (e.g., 5 ms) may be used to indicate a maximum TXOP duration value and the other combinations of (X, Y) may not be used.

This embodiment exemplifies a method of indicating the TXOP duration using a scheme of $X * Z^Y-1$. X, Y, and/or Z may be variously changed. For example, it may be appreciated that X and/or Z is a unit or granularity of a TXOP duration value. Since X and/or Z is variable, it may be appreciated that multiple granularities are used.

Embodiment 4

According to an embodiment, the TXOP duration may be set to other units (e.g., greater units or symbol units) instead of 1 microsecond (µs). For example, greater units such as 4 µs, 8 µs, 10 µs, 16 µs, 32 µs, 50 µs, 64 µs, 100 µs, 128 µs, 256 µs, 500 µs, 512 µs, 1024 µs, etc. may be used. In this case, the TXOP duration value will be determined as "unit (e.g., 64 µs) * value of TXOP duration field". For example, when a unit of 32 µs is used, the TXOP duration value may be TXOP Duration (1)=32 µs, TXOP Duration (2)=64 µs, TXOP Duration (3)=96 µs, etc.

Meanwhile, it is desirable that the TXOP duration have a maximum value up to 8 ms. Accordingly, when a single unit is used, the following options of the TXOP duration field may be considered.

Option 1: A unit of 32 µs is used and the TXOP duration field of 8 bits is defined. Herein, a maximum value of the TXOP duration may be 8192 µs.

Option 2: A unit of 64 µs is used and the TXOP duration field of 7 bits is defined. Herein, a maximum value of the TXOP duration may be 8192 µs.

If the size of the TXOP duration field is set to more than 8 bits (e.g., to 9 to 11 bits), the following structures of the TXOP duration field may be used.

Option A-1: 16 µs unit, ~32 ms, 11 bits
Option A-2: 16 µs unit, ~16 ms, 10 bits
Option A-3: 16 µs unit, ~8 ms, 9 bits
Option B-1: 32 µs unit, ~32 ms, 10 bits
Option B-2: 32 µs unit, ~16 ms, 9 bits
Option C-1: 64 µs unit, ~16 ms, 9 bits A combination of one or more units (e.g., (16 µs, 512 µs) or (8 µs, 128 µs), etc.) may be used.

●TXOP Termination/Truncation Method

Meanwhile, according to the above-described embodiments, the TXOP duration field of HE-SIG A may be set to indicate the TXOP duration based on a relatively large granularity. For example, a duration field included in a MAC header may be set based on a granularity of 1 µs, whereas the TXOP duration field of HE-SIG A may be set to indicate the TXOP duration based on a granularity greater than 1 µs.

Figure 23:
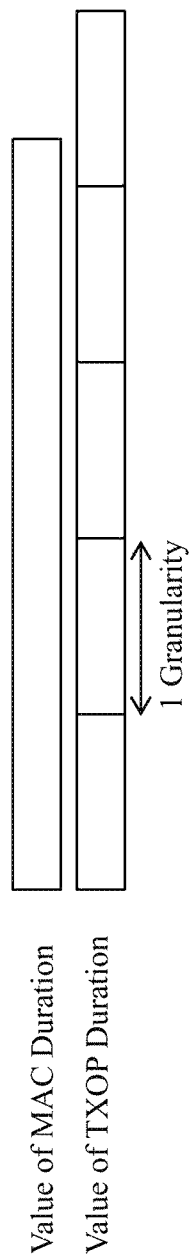
FIG. 23 illustrates a value of a TXOP duration indicated by HE-SIG A and a value of a MAC duration indicated by a MAC header.

FIG. 23 illustrates the case in which a granularity used in the TXOP duration field of the HE-SIG A field is greater than a granularity used in the duration field of the MAC header.

In this way, if the TXOP duration is set based on a granularity larger than the duration field of the MAC header by the TXOP duration field of the HE-SIG A field, a time longer than a time used for actual frame transmission may be set as the TXOP duration.

Accordingly, other STAs (e.g., third party STAs) may set a larger NAV than necessary based on the HE-SIG A field so that a channel cannot be used during a specific time and channel efficiency may be deteriorated. That is, there is a problem in that the third party STAs over-protect the TXOP duration.

Figure 24:
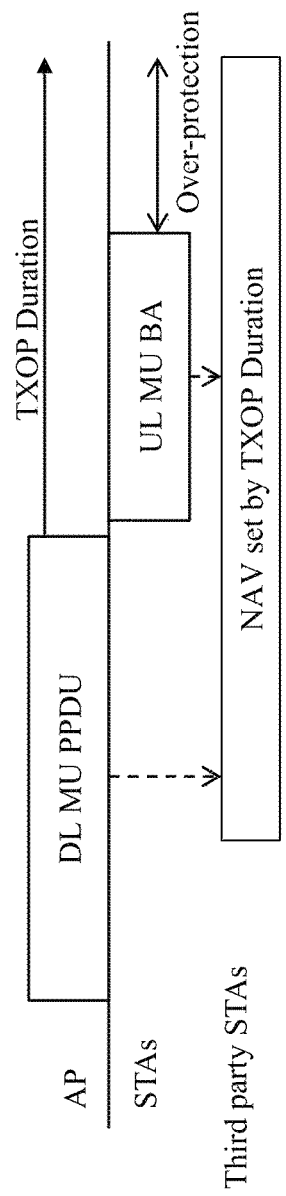
FIG. 24 illustrates over-protection of a TXOP duration.

FIG. 24 illustrates over-protection of a TXOP duration.

Referring to FIG. 24, an AP (e.g., a TXOP holder) transmits a DL MU PPDU frame. An HE-SIG A field of the DL MU PPDU frame includes a TXOP field and a MAC header field of the DL MU PPDU frame includes a duration field. It is assumed that the duration field of the MAC header field uses a granularity of 1 µs, whereas the TXOP field of the HE-SIG A field uses a granularity of N µs. N is a natural number larger than 1.

STAs (e.g., TXOP responders) that are designated as recipients of the DL MU PPDU frame transmit a UL MU BA frame as a response to reception of the DL MU PPDU frame in a TXOP duration. It is assumed that an additional frame is not subsequently transmitted by the AP (e.g., TXOP holder) and the STAs (e.g., TXOP responders) (e.g., TXOP termination).

STAs (e.g., third party STAs) that are not designated as the recipients of the DL MU PPDU frame cannot decode a MAC header. Therefore, the third party STAs set/update a NAV through the TXOP duration field of the HE-SIG A field. The STAs (e.g., third party STAs) set the NAV to a value of the TXOP duration field of the HE-SIG A field included in the DL MU PPDU frame transmitted by the AP. In some cases, the STAs (e.g., third party STAs) may update the NAV to the value of the TXOP duration field of the HE-SIG A field of the UL MU BA frame (e.g., when a TXOP duration value larger than a current NAV value is signaled).

Herein, since the NAV value set by the TXOP duration field of the HE-SIG A field is larger than an actual TXOP duration, over-protection corresponding to the difference between the NAV value and the TXOP duration occurs. The STAs (e.g., third party STAs) cannot access a channel during a time duration corresponding to over-protection.

To solve such a problem, information for early termination of a TXOP may be transmitted. For example, the TXOP holder/responder may transmit information indicating that early termination is performed in a last frame upon transmitting the last frame (e.g., ACK, Block ACK, or Multi-STA BA) during a TXOP duration. TXOP early termination may be referred to as TXOP truncation or simplified to (early) termination/truncation. Hereinafter, methods of terminating the TXOP will be described.

(1) Method using CF-END Frame

The TXOP holder/responder may terminate the TXOP by transmitting a CF-END frame after transmitting the last frame during the TXOP duration.

(2) Method using Early Termination Indicator

According to an embodiment, an STA may transmit an early termination indicator in a part of a frame (e.g., a common part etc. of HE-SIG A or HE-SIG B). For example, if the early termination indicator is set to 1, this may indicate that the TXOP is terminated early. The TXOP may be immediately terminated after a frame including the early termination indicator set to 1.

Meanwhile, the early termination indicator may be used by being combined with a duration field. For example, if early termination indicator=1, this may indicate that the TXOP is terminated at a time indicated by the duration field. If the duration field is set to 0, this may indicate that the TXOP is terminated after the corresponding frame. If the duration field is set to a value larger than 0, this may indicate that the TXOP is terminated at a time indicated by the duration field.

The term "early termination indicator" may be simply referred to as a termination indicator or a truncation indicator. While the early termination indicator may be explicitly signaled by the HE-SIG A field (e.g., a specific bit in the HE-SIG A field is set to the early termination indicator), the early termination indicator may be implicitly signaled. As an example of implicit signaling, if the TXOP duration field in HE-SIG A indicates a specific TXOP value, this may be interpreted as termination of the TXOP.

(i) a more data (MD) field or an ESOP field may be reused as the TXOP early termination indicator.

(ii) In a DL frame, the early termination indicator may be transmitted through the last frame of a set TXOP. For example, the TXOP duration may be updated and transmitted in the last frame, together with the early termination indicator. The TXOP duration may be set to a value smaller than a legacy TXOP duration and termination of the TXOP may be indicated through the early termination indicator.

(iii) When a frame is transmitted, if TXOP information needs to be updated, an STA (e.g., a TXOP holder/responder) transmits the frame by setting the frame to an updated TXOP. In the frame in which the TXOP is updated, the early termination indicator is used as a TXOP update indicator. For example, whenever the TXOP is updated, the early termination indicator may be set to 1 and transmitted. Upon receiving a frame in which the early termination indicator is set to 1. an STA (e.g., a third party STA) updates a TXOP of a corresponding STA (e.g., NAV update).

(iv) In the case of single-frame (e.g., PPDU) transmission, the TXOP duration may be set to the size of an ACK/BA frame. In the case of multi-frame transmission, the TXOP duration may be set to a duration for transmission of multi-frame and ACK/BA transmission.

(v) UL MU transmission: If a trigger frame is transmitted in a non-HT PPDU (e.g., 11a format), since the contents of the trigger frame accurately indicate the TXOP duration, even a legacy STA (e.g., an STA not supporting 11ax) may correctly set the TXOP duration (e.g., NAV setting/update). In addition, since a UL MU frame indicates the TXOP duration corresponding to the transmission length of the ACK/BA frame, NAV setting/update is not problematic.

However, if an 11ax format is used and the TXOP duration set in HE-SIG A is different from TXOP duration information (e.g., a TXOP duration of a MAC header) included in frame contents, NAV setting/update is problematic. For example, partial STAs (e.g., third party STAs) may read only the HE-SIG A field and other STAs (e.g., third party STAs) may read both the HE-SIG A field and the frame contents.

The STAs that have read both the HE-SIG A field and the frame contents set the TXOP through duration information of the frame contents (e.g., MAC header). For example, the STAs that have read both the HE-SIG A field and the frame contents contain the duration information included in the HE-SIG A field. Once the STAs read the duration of the MAC header (or duration of the contents), the STAs determine a final TXOP duration based on the duration of the MAC header (or duration of the contents) instead of the duration of the HE-SIG A field and update a NAV.

The STAs that have read only the HE-SIG A field update the NAV based on the TXOP duration included in the HE-SIG A field. Even in this case, setting the TXOP duration to be longer than the TXOP duration of the MAC header may be problematic. For example, when an ACK/BA/M-BA frame for the UL MU frame is transmitted, the STAs may update the TXOP through TXOP duration information included in the HE-SIG A/B frame or the MAC header (e.g., NAV update) but terminate the TXOP at a corresponding time if the early termination indicator (or TXOP update indicator) is set to 1.

(vi) Meanwhile, TXOP termination may be performed based on a BSS color. For example, an STA (e.g., third party STA) may be configured to terminate the TXOP only when TXOP termination is indicated through a frame corresponding to my BSS color. The STA (e.g., third party STA) confirms the BSS color included in a frame. If the BSS color indicates other BSSs, the STA (e.g., third party STA) does not terminate the TXOP even when the corresponding frame indicates TXOP termination. Accordingly, the STA (e.g., third party STA) may terminate/truncate the TXOP only when a frame of my BSS color indicates TXOP termination (e.g., through an explicit indicator, or implicit indication in which a duration is set to 0). However, loss of an access opportunity of a corresponding STA for other BSSs may occur.

(vi) According to an embodiment, an STA (e.g., a TXOP holder/responder) may necessarily transmit TXOP termination/truncation information in the last frame upon transmitting an 11ax frame in the TXOP. Meanwhile, in an 11a frame, since the TXOP is set through the duration of the MAC header, the TXOP can be accurately set. According to an embodiment, the duration of the MAC header may be overwritten into the TXOP duration of the HE-SIG A field.

(3) Method using Value of TXOP Duration Field of HE-SIG A Field

According to an embodiment, an STA (e.g., a TXOP holder/responder) may indicate TXOP early termination/truncation by setting the value of a duration field of a frame (e.g., the last frame transmitted in the TXOP) to a specific value (e.g., to 0 or by setting all bits to 1), instead of using an explicit TXOP termination indicator. Therefore, upon receiving a frame indicating Duration=specific value (e.g., 0), an STA (e.g., a third party STA) may determine that the TXOP duration is terminated/truncated after the corresponding frame. This may be appreciated as a role similar to a CF-END frame.

Figure 25:
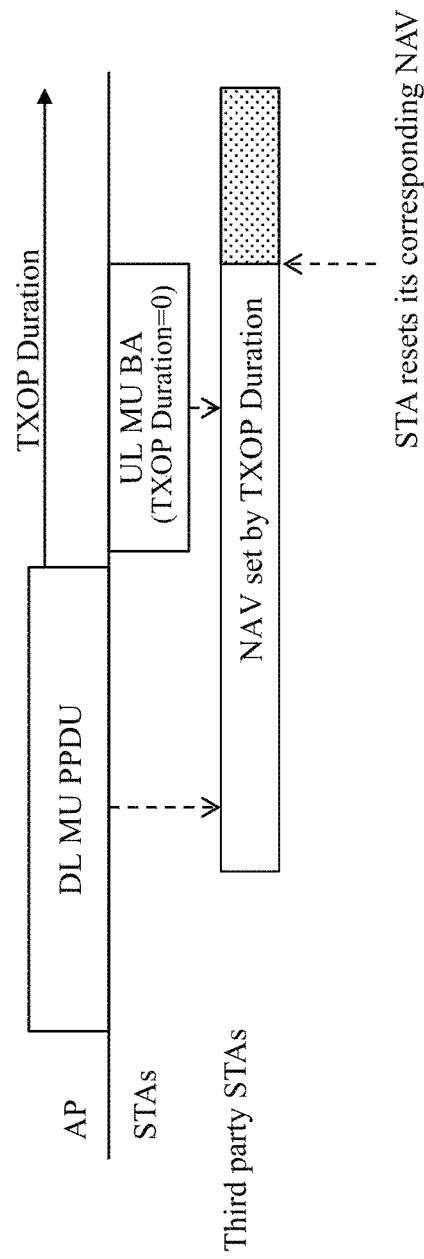
FIG. 25 illustrates TXOP truncation according to an embodiment of the present invention.

FIG. 25 illustrates TXOP truncation according to an embodiment of the present invention. For example, FIG. 25 illustrates a method for solving an over-protection problem illustrated in FIG. 24 and a repetitive description in FIG. 24 will be omitted herein.

Referring to FIG. 25, a TXOP duration of an HE-SIG A field of a UL MU BA frame (e.g., the last frame transmitted in a TXOP) is set to 0. TXOP duration=0 may mean the TXOP is truncated.

An STA (e.g., a third party STA) acquires the value of a TXOP duration field by decoding the HE-SIG A field of the UL MU BA frame. The STA (e.g., third party STA) confirms that TXOP duration=0 and resets a currently set NAV (e.g., a NAV set through a DL MU PPDU frame) (e.g., the NAV is set to 0).

According to a legacy NAV management operation, if currently set NAV≥received TXOP duration value, the STA does not update or reset the NAV. However, according to the present embodiment, upon receiving the TXOP duration set to 0, the STA resets the NAV even if currently set NAV>0. Accordingly, a time corresponding to over-protection can be efficiently eliminated from the TXOP duration.

(4) NAV Management Method

According to a legacy NAV setting/update method, NAV update has been performed only when a TXOP duration value of a received frame is larger than a currently set NAV value in an STA (e.g., a third party STA). For TXOP early termination, the NAV needs to be updated even when the TXOP duration value of the received frame is smaller than the currently set NAV value in the STA. According to an embodiment, the STA may update the NAV to a TXOP duration smaller than the currently set NAV value in the STA, based on the above-described TXOP truncation/termination/update indicator. However, update of the NAV to the TXOP duration smaller than the currently set NAV value may be configured to be performed based only on a TXOP truncation/termination/update indicator included in my BSS frame.

Meanwhile, the STA may set and maintain the NAV on a BSS color basis. For example, upon receiving a frame indicating TXOP truncation, the STA that has set the NAV on a BSS color basis may truncate the TXOP of the NAV corresponding to a BSS color indicated by the received frame.

To reduce complexity of NAV setting and management, the STA may set and maintain two NAVs, i.e., a NAV of my BSS and a NAV of other BSSs (e.g., BSSs other than my BSS or a frame which does not indicate my BSS). The term "NAV of my BSS" may be referred to an intra-BSS.

Figure 26:
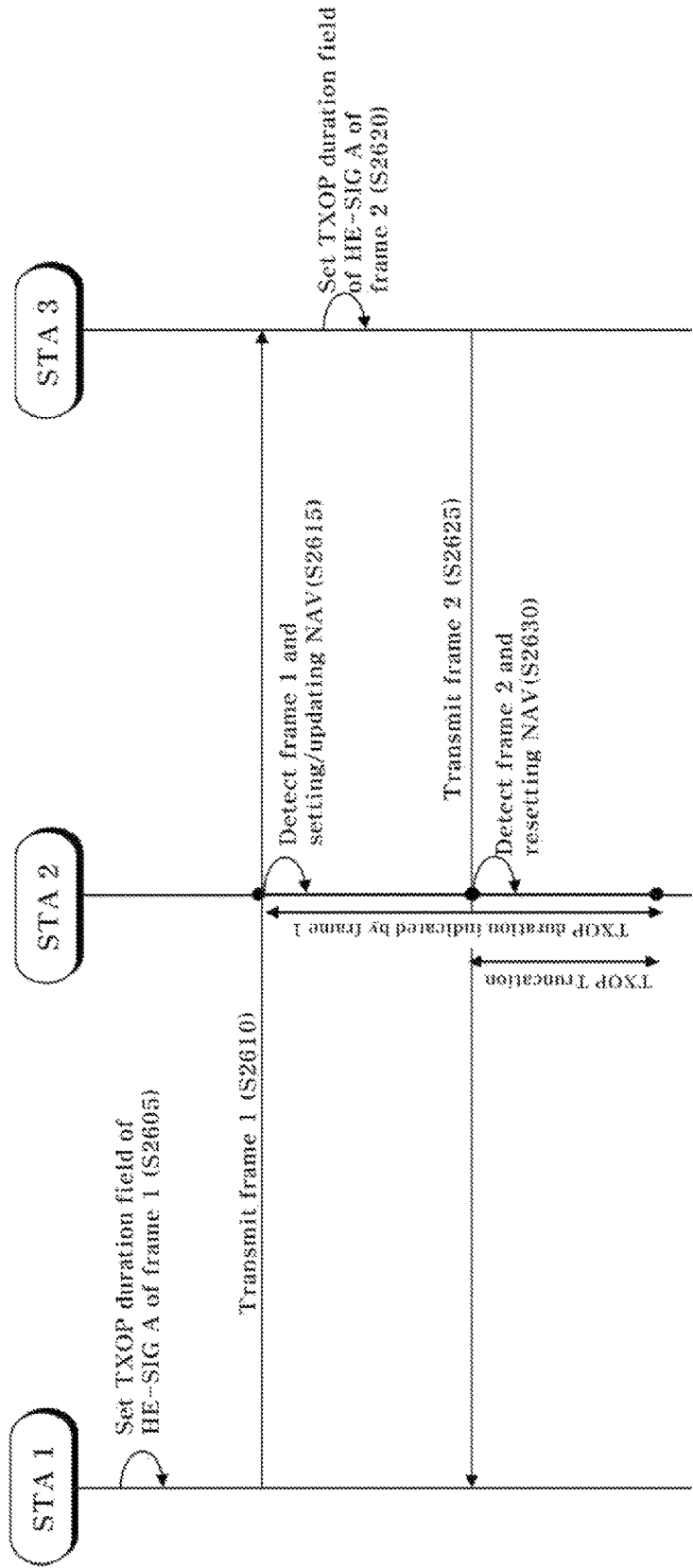
FIG. 26 illustrates a frame transmission and NAV management method according to an embodiment of the present invention.

FIG. 26 illustrates a frame transmission (e.g., TXOP management) and NAV management (e.g., frame reception) method according to an embodiment of the present invention. A repetitive description given above will be omitted. It is assumed that STA1 and STA3 are TXOP holder/responder STAs and STA2 is a third party STA. STA1, STA2, and STA3 may be AP STAs or non-AP STAs.

Referring to FIG. 26, STA1 sets a TXOP duration afield which is to be included in an HE-SIG A field of frame 1. The TXOP duration field of the HE-SIG A field may be set to indicate a TXOP duration value (e.g., length) using fewer bits than the number of bits used in a duration field (e.g., MAC duration field) included in a MAC header. To indicate the TXOP duration value, a granularity of a time unit used in the TXOP duration field may be set to be larger than a granularity (e.g., 1 µs) of a time unit used in the duration field of the MAC header (e.g., to a multiple of an integer such as 8 µs, 16 µs, 128 µs, 256 µs, 512 µs, or 1024 µs). The duration field of the MAC header may be set to 15 bits.

All of the TXOP duration value indicated by the TXOP duration field and the TXOP duration value (e.g.. MAC duration) indicated by the duration field of the MAC header are set for transmission of the same frame. The TXOP duration value indicated by the TXOP duration field may be calculated based on the MAC duration value. The TXOP duration value indicated by the TXOP duration field may be determined to be larger than the MAC duration value.

STA1 transmits frame 1 including the HE-SIG A field and the MAC header (S2610).

For convenience of description, it is assumed that STA3 is designated as a recipient of frame 1. For example, it is assumed that an RA field of frame 1 transmitted by STA1 is set to an address of STA3 (e.g., a MAC address or AID of STA3). Accordingly, STA1/STA3 is a TXOP holder/responder and STA2 is a third party STA.

STA2 receives (or detects) frame 1 transmitted by STA1 to STA3 (S2615).

STA2 may perform NAV management based on any one of the TXOP duration field included in the HE-SIG A field and the duration field included in the MAC header (S2615). NAV management may refer to setting (e.g., initial setting), update, or resetting of a time during which channel access is limited in order to protect a TXOP of a sender (e.g., STA1) of frame 1 or a recipient (e.g., STA3) of frame 1 when STA2 is not designated as the recipient of frame 1.

In performing NAV management, STA2 may perform NAV management based on the duration field of the MAC header when STA2 is capable of decoding the MAC header and perform NAV management based on the TXOP duration field (e.g., HE-SIG A) when STA2 is not capable of decoding the MAC header. In the present embodiment, it is assumed for convenience that STA2 sets the NAV based on the TXOP duration field (e.g., HE-SIG A).

If STA2 does not have a currently set NAV value (e.g., NAV=0), STA2 sets the NAV based on the TXOP duration field (e.g., HE-SIG A) of frame 1.

If STA2 has a currently set NAV value (e.g., NAV>0), STA2 may update the NAV based on the TXOP duration field (e.g., HE-SIG A) of frame 1. For example, if the TXOP duration value indicated by the TXOP duration field is larger than the current NAV value set by STA2, STA2 may set (e.g., update) the NAV of the STA to the TXOP duration value indicated by the TXOP duration field. In this case, it is assumed that the TXOP duration value included in frame 1 is not a value corresponding to a TXOP termination indicator.

STA3 that has received frame 1 sets a TXOP duration field included in HE-SIG A of frame 2 which will be transmitted to STA1 (S2620). In setting the TXOP duration field, STA3 may set a TXOP duration value corresponding to the length of the TXOP duration in the TXOP duration field (e.g.. HE-SIG A) of frame 2 when frame 2 is not the last frame transmitted in the TXOP duration. The TXOP duration value set by STA3 in the TXOP duration field (e.g., HE-SIG A) of frame 2 may be a value updated (e.g., TXOP prolong) by STA3 when needed or a value corresponding to the TXOP duration value set by STA1 in the TXOP duration field (e.g., HE-SIG A) of frame 1.

If frame 2 is the last frame transmitted in the TXOP duration, STA3 may set a predetermined value corresponding to the TXOP termination indicator in the TXOP duration field (e.g., HE-SIG A of frame 2). For example, the predetermined value may indicate that the length of the TXOP duration is "0". The predetermined value may be used to eliminate a redundant TXOP duration caused by the difference between the TXOP duration value set in the TXOP duration field (e.g., HE-SIG A of frame 2) and the MAC duration set in the MAC header (e.g., frame 2).

As described above, STA3 may determine the TXOP duration value which is to be set in the TXOP duration field (e.g., frame 2) of HE-SIG A, based on the MAC duration value set in the MAC header (e.g., frame 2). A granularity of a time unit of the TXOP duration value may be set to be greater than a granularity of a time unit of the MAC duration value. In addition, the TXOP duration value set in the TXOP duration field of HE-SIG A may be set to be equal to or greater than the MAC duration value set in the MAC header of frame 2.

For convenience, it is assumed that frame 2 is the last frame transmitted in the TXOP duration. It is also assumed that a predetermined value (e.g., 0) corresponding to the TXOP termination indicator is set in the TXOP duration field of frame 2.

STA3 transmits frame 2 including the HE-SIG A field and the MAC header (S2625).

STA2 may detect (or receive) frame 2 and reset a NAV based on frame 2 (S2630). If the TXOP duration field in frame 2 indicates a predetermined value, STA2 may reset the NAV of STA2 without comparison with a current NAV value. For example, if the TXOP duration field indicates a predetermined value, STA2 may reset the NAV of STA2 under the assumption that frame 2 is the last frame transmitted in the corresponding TXOP duration. Accordingly, a redundant TXOP may be truncated by frame 2.

Figure 27:
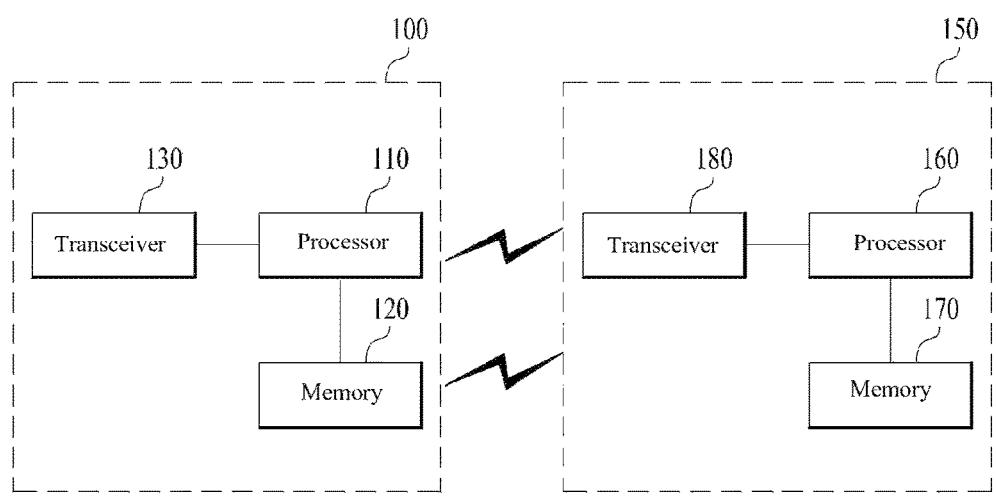
FIG. 27 is an explanatory diagram of apparatuses according to an embodiment of the present invention.

FIG. 27 is an explanatory diagram of apparatuses for implementing the aforementioned method.

A wireless device 800 and a wireless device 850 in FIG. 27 may correspond to the aforementioned STA/AP 1 and STA/AP 2, respectively.

The STA 800 may include a processor 810, a memory 820, and a transceiver 830 and the AP 850 may include a processor 860, a memory 870, and a transceiver 860. The transceivers 830 and 880 may transmit/receive a wireless signal and may be implemented in a physical layer of IEEE 802.11/3GPP. The processors 810 and 860 are implemented in a physical layer and/or a MAC layer and are connected to the transceivers 830 and 880. The processors 810 and 860 may perform the above-described UL MU scheduling procedure.

The processors 810 and 860 and/or the transceivers 830 and 880 may include an Application-Specific Integrated Circuit (ASIC), a chipset, a logical circuit, and/or a data processor. The memories 820 and 870 may include a Read-Only Memory (ROM), a Random Access Memory (RAM), a flash memory, a memory card, a storage medium, and/or a storage unit. If an example is performed by software, the above-described method may be executed in the form of a module (e.g., a process or a function) performing the above-described function. The module may be stored in the memories 820 and 870 and executed by the processors 810 and 860. The memories 820 and 870 may be located at the interior or exterior of the processors 810 and 860 and may be connected to the processors 810 and 860 via known means.

The detailed description of the preferred examples of the present invention has been given to enable those skilled in the art to implement and practice the invention. Although the invention has been described with reference to the preferred examples, those skilled in the art will appreciate that various modifications and variations can be made in the present invention without departing from the spirit or scope of the invention described in the appended claims. Accordingly, the invention should not be limited to the specific examples described herein, but should be accorded the broadest scope consistent with the principles and novel features disclosed herein.

INDUSTRIAL APPLICABILITY

The present invention has been described on the assumption that the present invention is applied to a wireless LAN system supporting HE PPDUs. However, the present invention is not limited thereto and can be applied to various wireless communication systems including IEEE 802.11.

The invention claimed is:

1. A method of managing, by a station (STA), a Network Allocation Vector (NAV) in a wireless Local Area Network (LAN) system supporting a High-Efficiency Physical Layer Protocol Data Unit (HE PPDU), the method comprising:
   receiving a frame including a High-Efficiency Signal A (HE-SIG A) field and a Media Access Control (MAC) header; and
   updating the NAV based on a transmission opportunity (TXOP) duration field included in the HE-SIG A field,
   wherein a TXOP duration value indicated by the TXOP duration field of the HE-SIG A field is equal to or larger than a MAC duration value indicated by the MAC header, and
   wherein the updating the NAV includes setting the NAV of the STA to the TXOP duration value indicated by the TXOP duration field when the TXOP duration value indicated by the TXOP duration field is larger than a current NAV value set in the STA and resetting the NAV of the STA without comparison with the current NAV value when the TXOP duration field indicates a predetermined value.

2. The method according to claim 1, wherein the predetermined value indicates that a length of a corresponding TXOP duration is '0'.

3. The method according to claim 1, wherein if the TXOP duration field indicates the predetermined value, the STA resets the NAV of the STA by assuming that the received frame is a last frame transmitted in a corresponding TXOP duration.

4. The method according to claim 1, wherein the predetermined value corresponds to a TXOP termination indicator.

5. The method according to claim 1, wherein the predetermined value is used to eliminate a redundant TXOP duration caused by a difference between the TXOP duration value indicated by the TXOP duration field and the MAC duration value indicated by the MAC header.

6. The method according to claim 1, wherein the STA updates the NAV through the TXOP duration value when the MAC header cannot be decoded.

7. The method according to claim 1, wherein a granularity of a time unit of the TXOP duration value is set to be greater than a granularity of a time unit of the MAC duration value.

8. The method according to claim 1, wherein the NAV of the STA is used to set a time during which channel access of the STA is limited in order to protect of a TXOP of another STA designated by the frame as a sender or a recipient.

9. A station (STA) for managing a Network Allocation Vector (NAV) in a wireless Local Area Network (LAN) system supporting a High-Efficiency Physical Layer Protocol Data Unit (HE PPDU), the STA comprising:
   a receiver configured to receive a frame including a High-Efficiency Signal A (HE-SIG A) field and a Media Access Control (MAC) header; and
   a processor configured to update the NAV based on a Transmission Opportunity (TXOP) duration field included in the HE-SIG A field,
   wherein a TXOP duration value indicated by the TXOP duration field of the HE-SIG A field is equal to or larger than a MAC duration value indicated by the MAC header, and
   wherein, in updating the NAV, the processor sets the NAV of the STA to the TXOP duration value indicated by the TXOP duration field when the TXOP duration value indicated by the TXOP duration field is larger than a current NAV value set in the STA and resets the NAV of the STA without comparison with the current NAV value when the TXOP duration field indicates a predetermined value.

10. A method of transmitting, by a station (STA), a frame in a wireless Local Area Network (LAN) system supporting a High-Efficiency Physical Layer Protocol Data Unit (HE PPDU), the method comprising:
    setting a Transmission Opportunity (TXOP) duration field included in a High-Efficiency Signal A (HE-SIG A) field; and
    transmitting a frame including the HE-SIG A field,
    wherein a TXOP duration value set in the TXOP duration field of the HE-SIG A field is equal to or larger than a Media Access Control (MAC) duration value indicated by a MAC header, and
    wherein the setting the TXOP duration field includes setting the TXOP duration value corresponding to a length of a TXOP duration in the TXOP duration field when the frame is not a last frame transmitted in the TXOP duration and setting a predetermined value corresponding to a TXOP termination indicator in the TXOP duration field when the frame is the last frame transmitted in the TXOP duration.

11. The method according to claim 10, wherein the predetermined value indicates that the length of the TXOP duration is '0'.

12. The method according to claim 10, wherein the predetermined value is used to eliminate a redundant TXOP duration caused by a difference between the TXOP duration value set in the TXOP duration field and the MAC duration value set in the MAC header.

13. The method according to claim 10, wherein the setting the TXOP duration field includes determining the TXOP duration value to be set in the TXOP duration field of the HE-SIG A field, based on the MAC duration value set in the MAC header, and a granularity of a time unit of the TXOP duration value is set to be greater than a granularity of a time unit of the MAC duration value.

\* \* \* \* \*